(12) United States Patent
Ichinomiya et al.

(10) Patent No.: US 8,054,612 B2
(45) Date of Patent: Nov. 8, 2011

(54) PLUG-IN UNIT INCLUDING A BREAKER AND AN ELECTRIC DEVICE

(75) Inventors: Kenji Ichinomiya, Kumamoto (JP); Toshiyuki Kawano, Kumamoto (JP); Takami Satoh, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 225 days.

(21) Appl. No.: 12/626,031

(22) Filed: Nov. 25, 2009

(65) Prior Publication Data

US 2010/0128417 A1 May 27, 2010

(30) Foreign Application Priority Data

Nov. 27, 2008 (JP) ................. 2008-301887
Apr. 24, 2009 (JP) ................. 2009-106202

(51) Int. Cl.
*H02B 1/04* (2006.01)
*H01H 9/02* (2006.01)

(52) U.S. Cl. ......... 361/636; 335/202; 335/132; 200/307

(58) Field of Classification Search .......... 361/627–640; 335/202, 132; 200/51 R, 51.11, 293, 303, 200/307, 330, 331, 334
See application file for complete search history.

(56) References Cited

U.S. PATENT DOCUMENTS

| 4,691,978 A | * | 9/1987 | Lemmer | 439/620.09 |
| 4,717,899 A | * | 1/1988 | Drexler et al. | 335/131 |
| 5,652,420 A | * | 7/1997 | Innes et al. | 200/50.32 |
| 5,870,278 A | * | 2/1999 | Girard et al. | 361/627 |
| 6,515,850 B2 | * | 2/2003 | Fournier et al. | 361/627 |
| 7,012,800 B2 | * | 3/2006 | Busch et al. | 361/605 |

FOREIGN PATENT DOCUMENTS

| JP | 11-346407 A | 12/1999 |
| JP | 2008-061455 A | 3/2008 |
| JP | 2008-109808 A | 5/2008 |
| JP | 2008-109809 A | 5/2008 |

* cited by examiner

*Primary Examiner* — Zachary M Pape
(74) *Attorney, Agent, or Firm* — Pearne & Gordon LLP

(57) ABSTRACT

A plug-in unit includes a breaker electrically connected with a busbar at a power supply side and an electric device electrically connected with the breaker. Joint surfaces making contact with each other are formed at the breaker and the electric device, respectively. The breaker includes a terminal metal fitting connecting the busbar thereto and a plug-in terminal metal fitting installed at the joint surface of the breaker, and the electric device includes a plug terminal, which is installed at the joint surface thereof and capable of being connected with the plug-in terminal metal fitting. The breaker is detachably joined with the electric device by an engaging member including an engaging unit and an engagement receiving unit. The engaging unit and the engagement receiving unit are installed at the joint surfaces of the breaker and the electric device, respectively, and detachably engaged with each other.

21 Claims, 26 Drawing Sheets

6: BUSBAR
10: BREAKER
13: JOINT SURFACE
14: RECESS GROOVE
18B: INSERTION HOLE
20: ELECTRIC DEVICE
21: JOINT SURFACE
26: ELECTRIC CONDUCTION CHECKING MEMBER
40: ENGAGING MEMBER
41: ENGAGING UNIT
42: ENGAGEMENT RECEIVING UNITS

6: BUSBAR
10: BREAKER
13: JOINT SURFACE
14: RECESS GROOVE
18B: INSERTION HOLE
20: ELECTRIC DEVICE
21: JOINT SURFACE
26: ELECTRIC CONDUCTION CHECKING MEMBER
40: ENGAGING MEMBER
41: ENGAGING UNIT
42: ENGAGEMENT RECEIVING UNITS

11: TERMINAL METAL FITTING
22: PLUG TERMINAL
30, 30A, 30B: PLUG-IN TERMINAL METAL FITTING

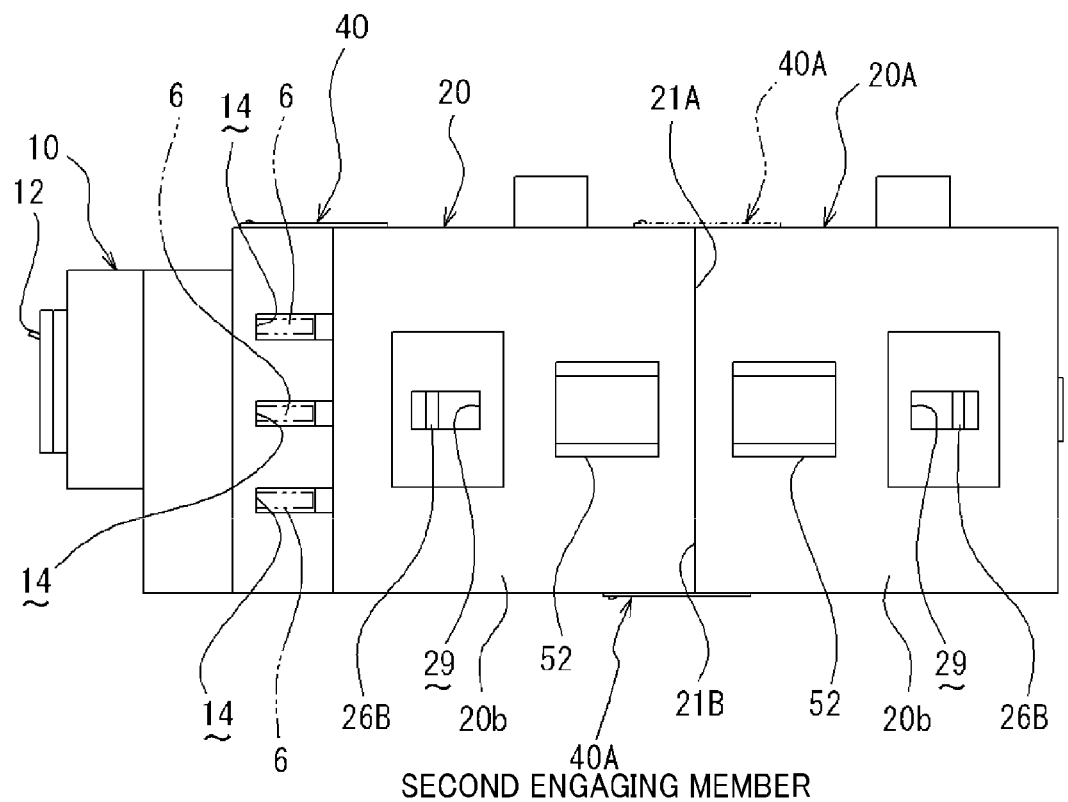

20A: SECOND ELECTRIC DEVICE
30D: PLUG-IN TERMINAL METAL FITTING
80: TOP SURFACE
82: INSERTION HOLE

PLUG-IN UNIT INCLUDING A BREAKER AND AN ELECTRIC DEVICE

CROSS-REFERENCE TO RELATED APPLICATION

This application claims the benefit of Japanese Patent Application No. 2008-301887, filed on Nov. 27, 2008 and Japanese Patent Application No. 2009-106202, filed on Apr. 24, 2009, the entire disclosures of which are incorporated herein by reference.

FIELD OF THE INVENTION

The present disclosure relates to a plug-in unit.

BACKGROUND OF THE INVENTION

Generally, a distribution panel has a structure in which a plurality of busbars, which is electrically connected with a load terminal of, e.g., a three-phase 200V main breaker connected with a power supply, is connected with a power supply terminal of a branch breaker, so that electricity of, e.g., a single-phase 200V power is supplied to an electric device such as a magnet conductor serving as a load.

Conventionally, there has been known a configuration of a distribution panel in which a branch breaker having a plug terminal metal fitting capable of electrically connecting with busbars is installed therein. Further, the branch breaker and an adapter having a clip-type plug terminal metal fitting capable of electrically connecting with the busbars are screw-coupled to the distribution panel via a mounting base (see, for example, Patent Document 1).

Further, there has been known another configuration of a distribution panel in which a mounting base installed in the distribution panel is screw-coupled with a breaker mount where a branch breaker electrically connected with busbars is mounted, so that the branch breaker is fixed to the distribution panel (see, for example, Patent Documents 2 and 3).

Patent Document 1: Japanese Patent Laid-open Publication No. 2008-61455 (FIGS. 1, 12 and 14)
Patent Document 2: Japanese Patent Laid-open Publication No. 2008-109808 (FIGS. 1, 4, 5 and 6)
Patent Document 3: Japanese Patent Laid-open Publication No. 2008-109809 (FIGS. 1, 4, 5 and 6)

BRIEF SUMMARY OF THE INVENTION

However, in Patent Documents 1, 2 and 3, a screw member is used to fix a branch breaker to a distribution panel, so that installation thereof may be complicated and the number of processes for the assembly may be increased.

Further, a cable or a busbar is used to connect the branch breaker with an electric device such as a magnet conductor. However, if plural branch breakers are connected with plural magnet conductors, the number of components is increased. Moreover, the wiring becomes complicated and the number of wiring processes is increased, so that it may cause a wiring miss.

The present disclosure provides a plug-in unit in which the number of components and the number of wiring processes are reduced by removing a wiring between a branch breaker and an electric device, and, thus, the quality can be improved by reducing a wiring miss.

In accordance with the present disclosure, there is provided a plug-in unit including: a breaker electrically connected with a busbar at a power supply side; and an electric device electrically connected with the breaker. Joint surfaces making contact with each other are formed at the breaker and the electric device, respectively. Here, the breaker includes a terminal metal fitting connecting the busbar thereto and a plug-in terminal metal fitting installed at the joint surface of the breaker, and the electric device includes a plug terminal, which is installed at the joint surface thereof and capable of being connected with the plug-in terminal metal fitting. The breaker is detachably joined with the electric device by an engaging member including an engaging unit and an engagement receiving unit. The engaging unit and the engagement receiving unit are installed at the joint surfaces of the breaker and the electric device, respectively, and detachably engaged with each other.

BRIEF DESCRIPTION OF THE DRAWINGS

FIG. 13B is a side view thereof.

DETAILED DESCRIPTION OF THE INVENTION

Hereinafter, illustrative embodiments of the present disclosure will be described in detail with reference to the accompanying drawings.

Figure 1:
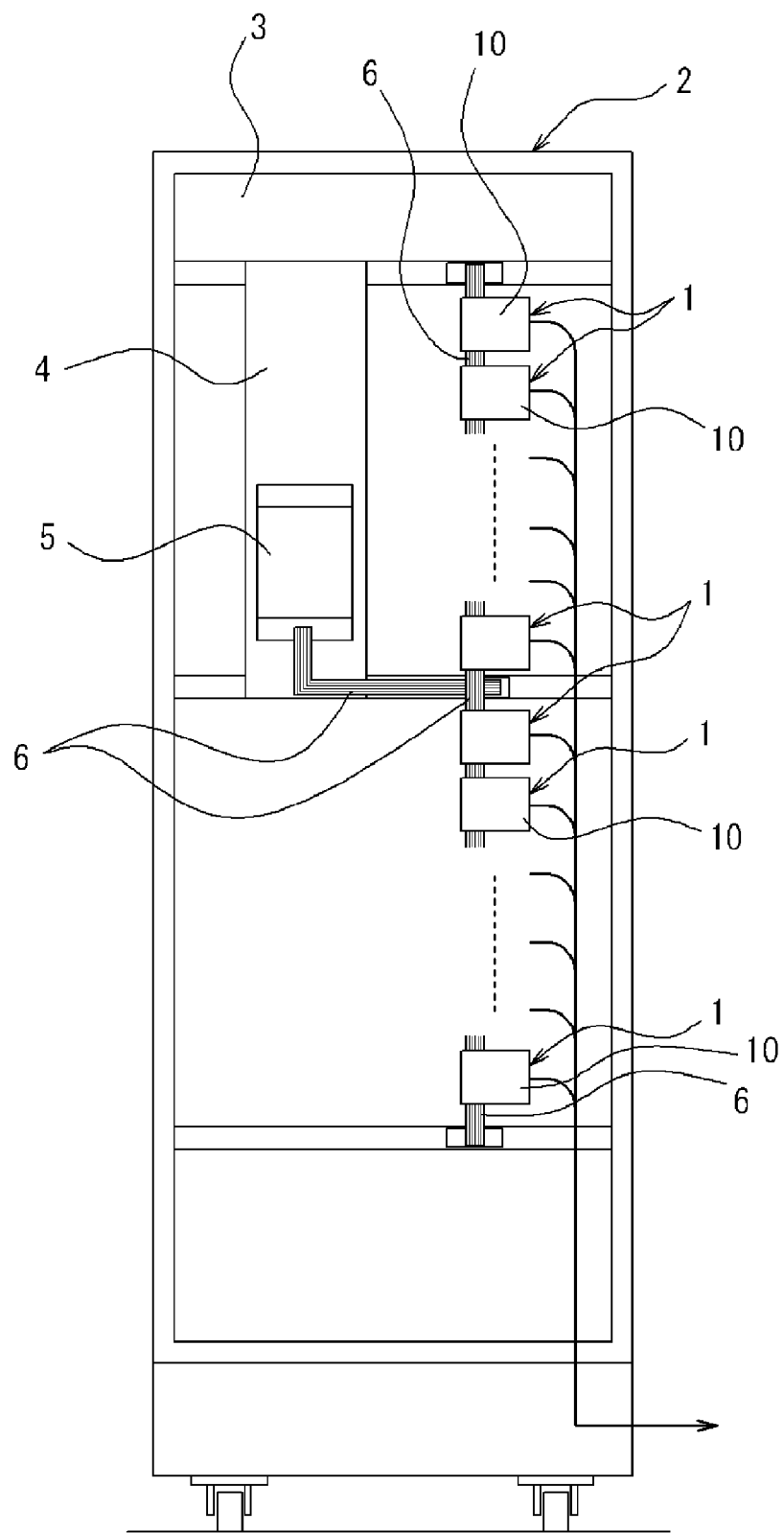
FIG. 1 is a schematic front view showing an example of a distribution panel having a plug-in unit in accordance with the present disclosure.
Figure 2:
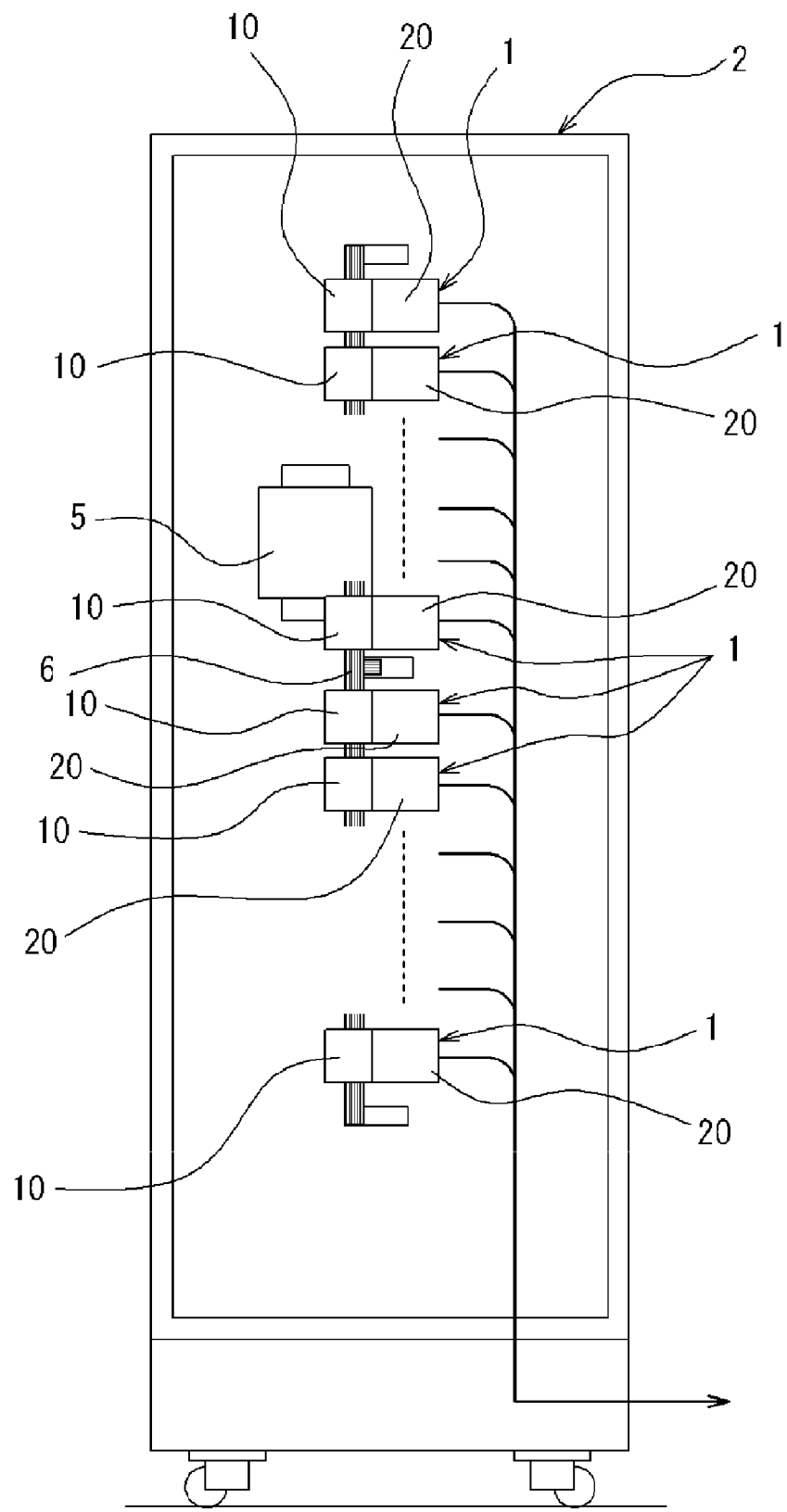
FIG. 2 is a schematic side view of the distribution panel.
Figure 3:
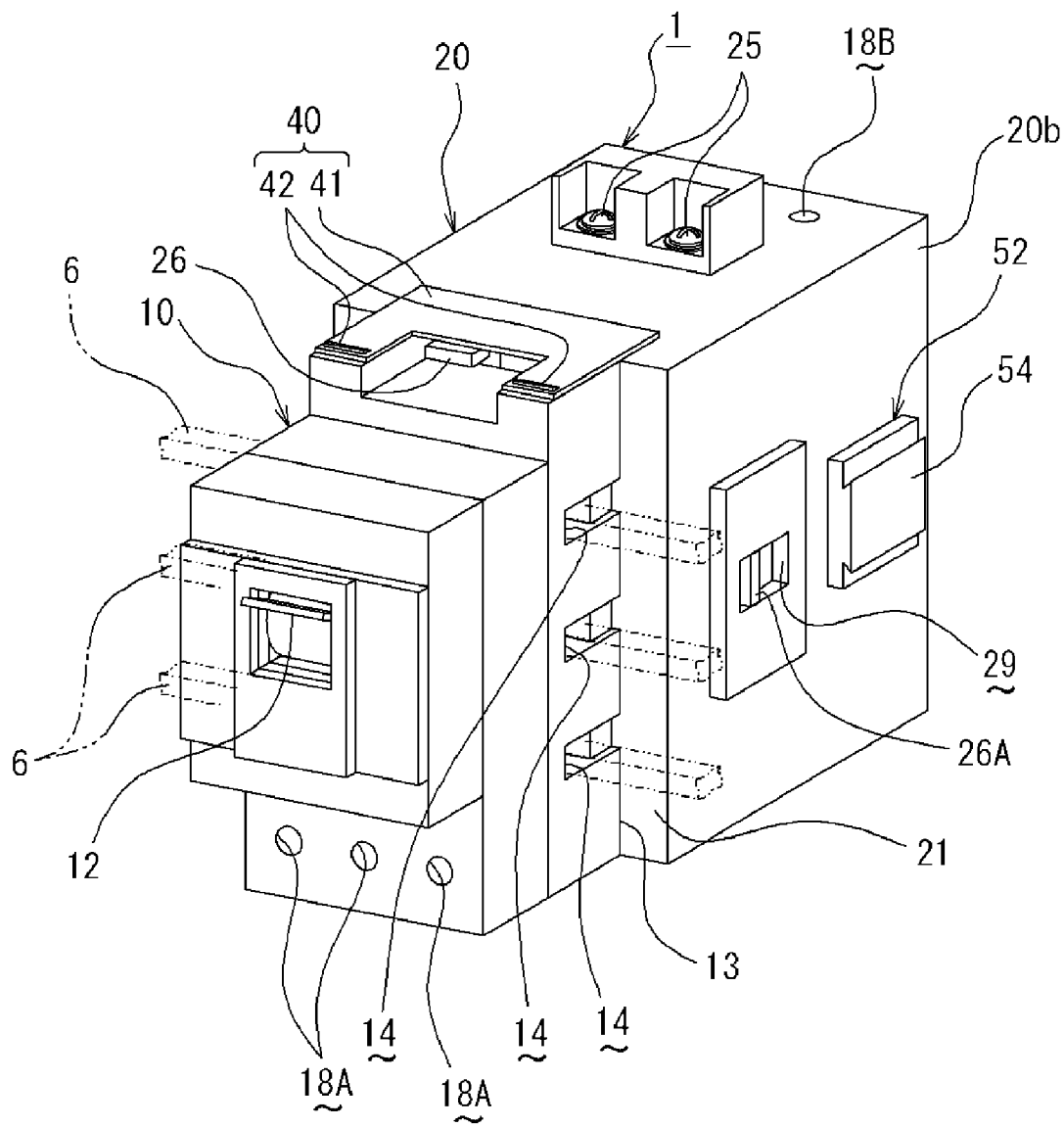
FIG. 3 is a perspective view showing a joint state between a breaker and an electric device of the plug-in unit in accordance with a first embodiment of the present disclosure.
Figure 4A:
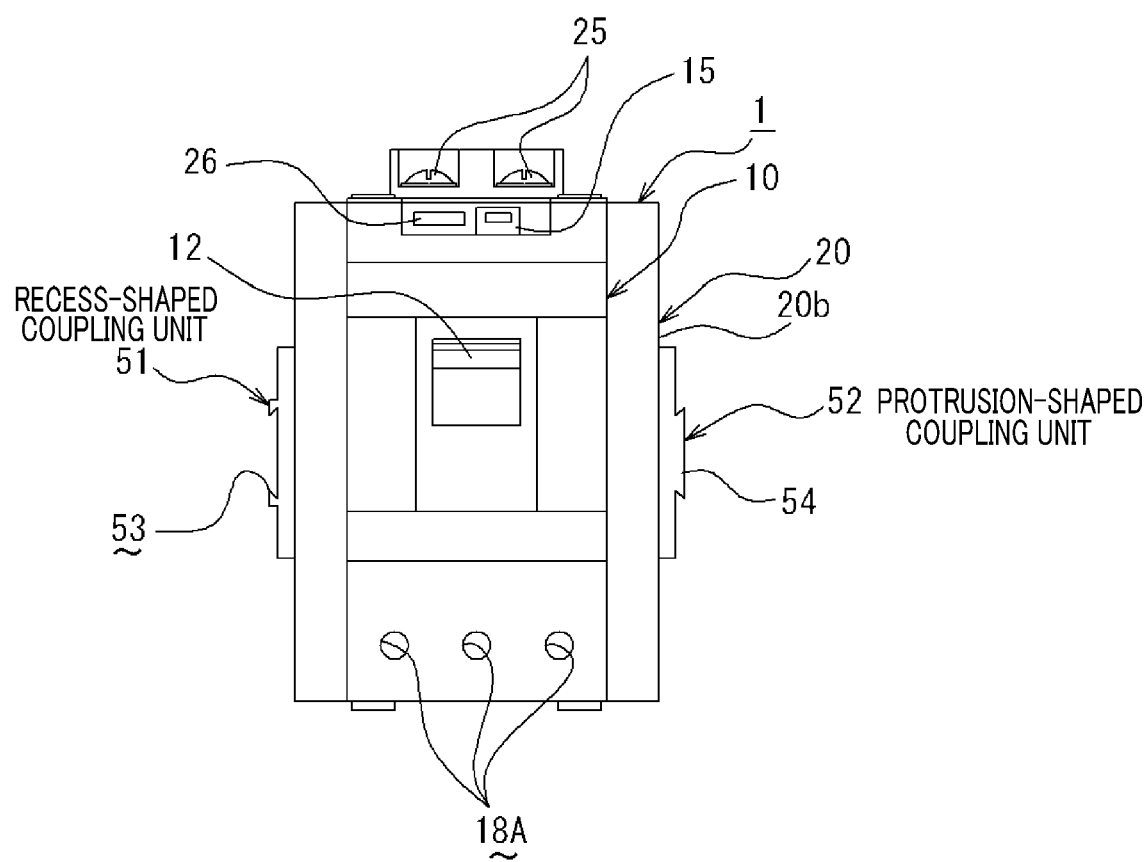
FIG. 4A is a front view of the plug-in unit of the first embodiment.
Figure 4B:
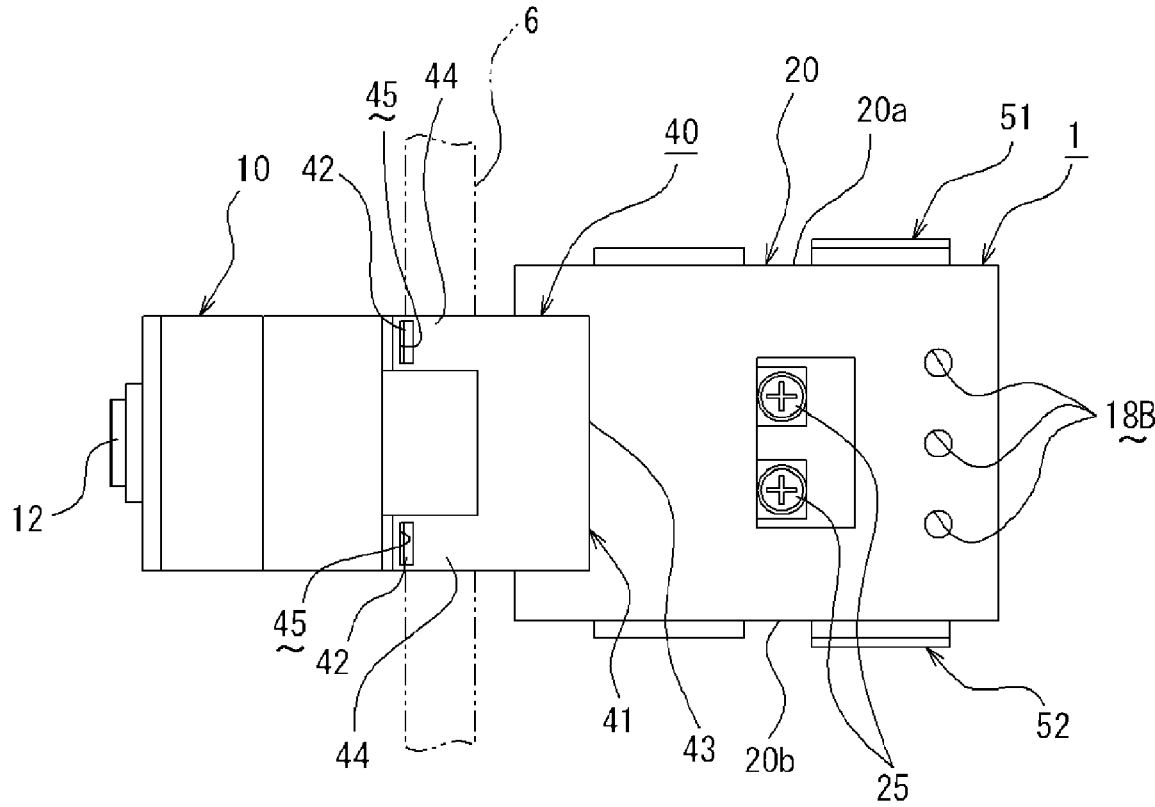
FIG. 4B is a plane view thereof.
Figure 5:
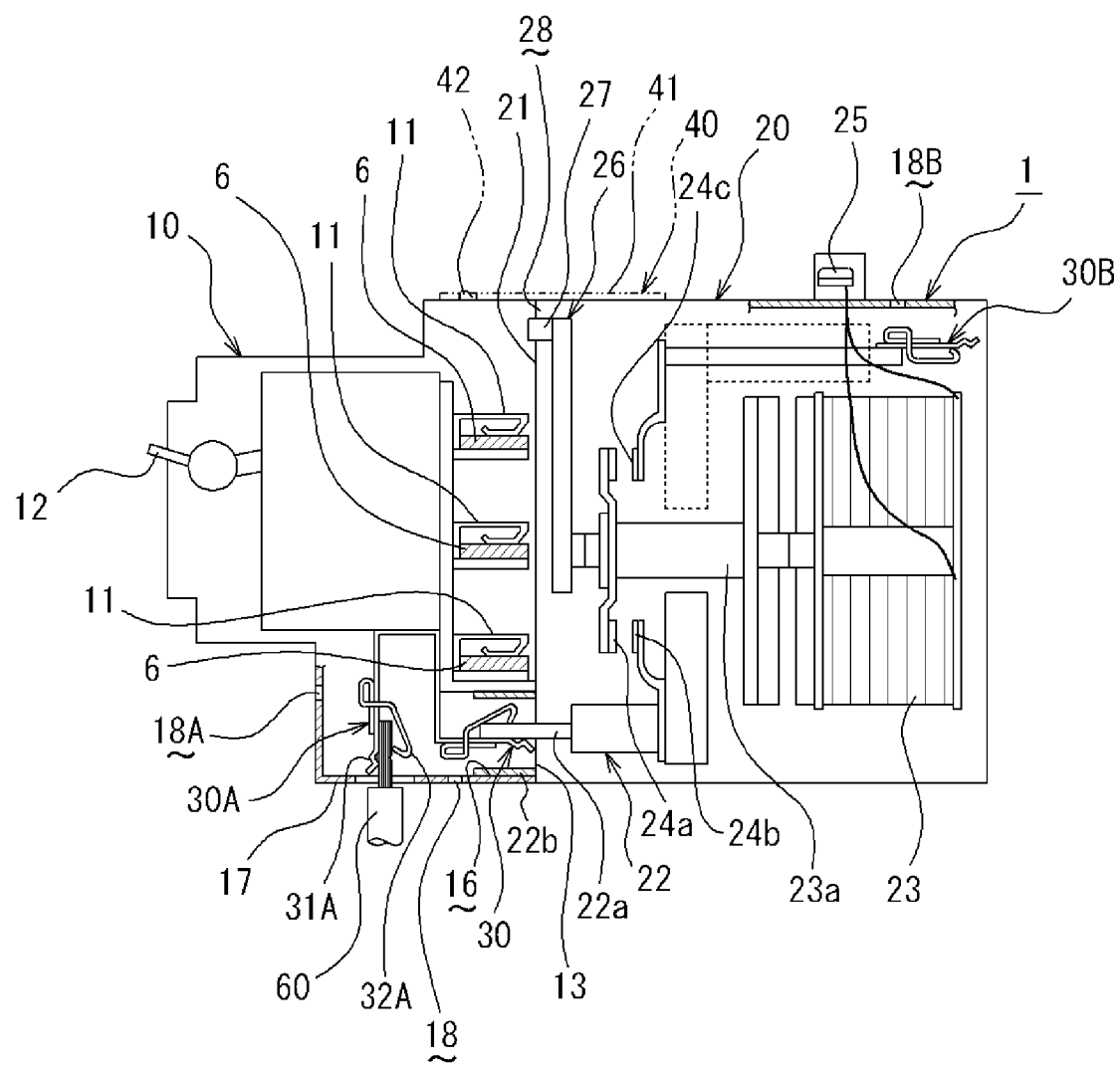
FIG. 5 is a schematic cross-sectional view of the plug-in unit of the first embodiment.
Figure 6A:
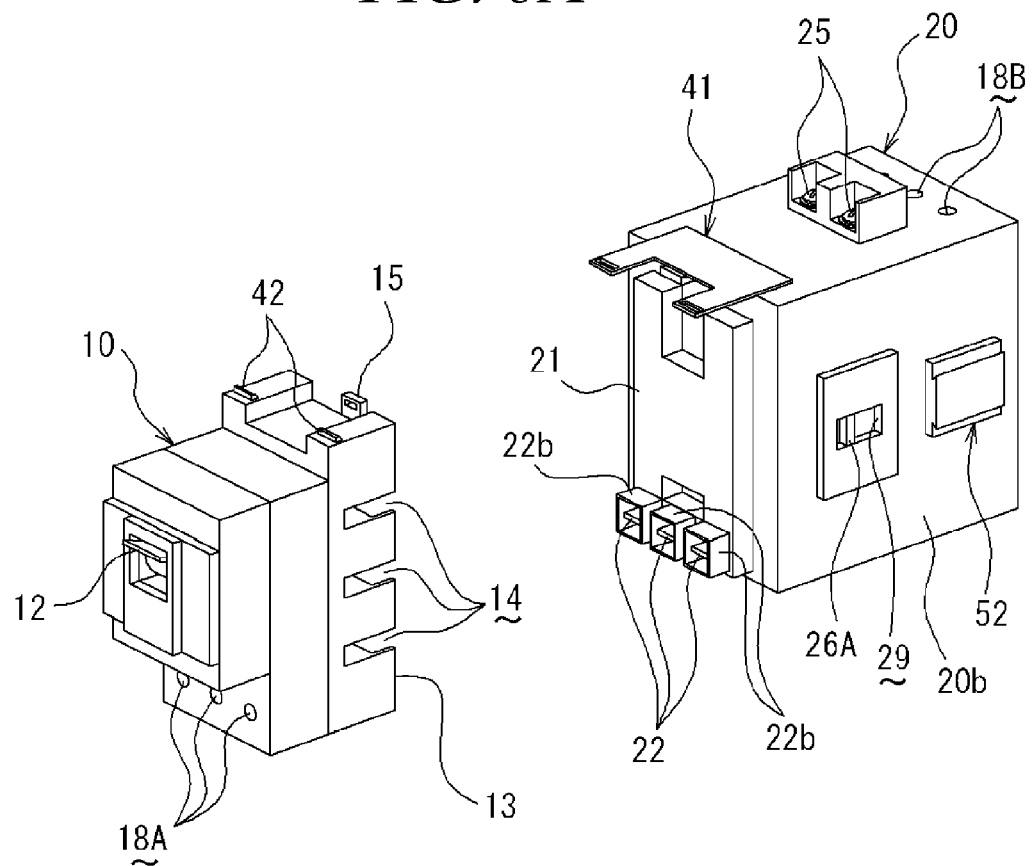
FIG. 6A is a front exploded perspective view of the plug-in unit of the first embodiment.
Figure 6B:
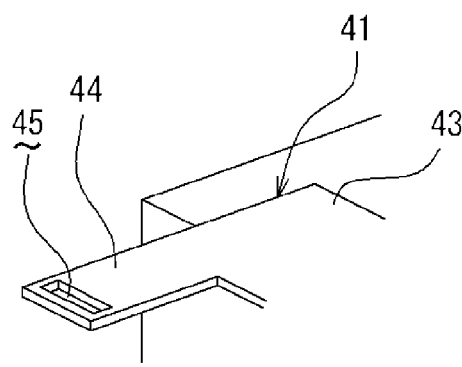
FIG. 6B is an enlarged perspective view of a main portion of an engaging unit of an engaging member in accordance with the present disclosure.
Figure 6C:
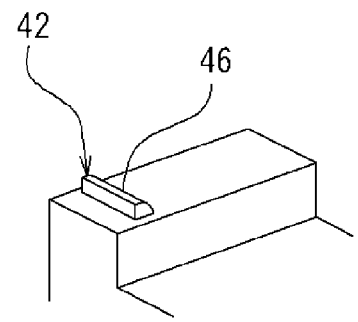
FIG. 6C is an enlarged perspective view of a main portion of engagement receiving units of the engaging member.

FIG. 1 is a schematic front view showing an example of a plug-in unit in accordance with the present disclosure installed in a distribution panel; FIG. 2 is a schematic side view of FIG. 1; FIG. 3 is a perspective view of a coupling state of the plug-in unit; FIG. 4A is a front view of the coupling state of the plug-in unit; FIG. 4B is a plane view thereof; and FIG. 5 is a schematic cross-sectional view of the coupling state of the plug-in unit.

A plug-in unit 1 in accordance with the present disclosure includes a branch breaker 10 (hereinafter, simply referred to as "a breaker 10") and an electric device 20 such as a magnet conductor which is joined to a load side of the breaker 10. A main breaker 5 is fixed to a fixing base 3 of a distribution panel 2 having a box shape by a mounting member 4. A plurality of busbars 6 is electrically connected to a load terminal of the main breaker 5. The breaker 10 is electrically connected to the plurality of busbars 6 via terminal metal fittings 11 serving as power supply terminals.

With the plug-in unit 1 configured as described above, electricity such as a single-phase 200 V power is supplied to the electric device 20 serving as a load via the breaker 10, which is electrically connected with the load terminal of the main breaker 5 of, e.g., a three-phase 200 V connected with a power supply.

Installed at a front surface of the breaker 10 is a knob 12 for electrically connecting or disconnecting each input terminal with each corresponding output terminal by turning on or off a contact point inside the breaker 10. Further, a joint surface 13 at a rear surface of the breaker 10 is provided to be in contact with a joint surface 21 at a front surface of the electric device 20 to be described later.

Figure 7:
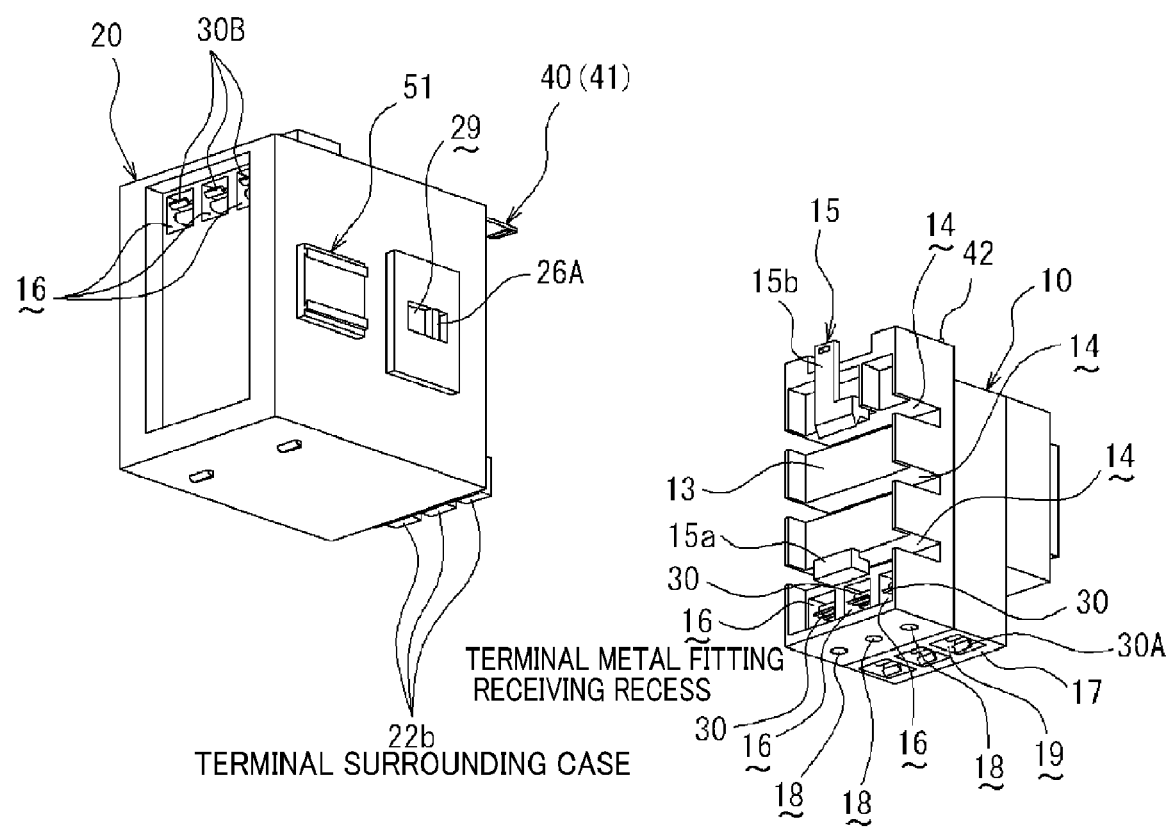
FIG. 7 is an exploded perspective view showing a rear side of the plug-in unit of the first embodiment.
Figure 8A:
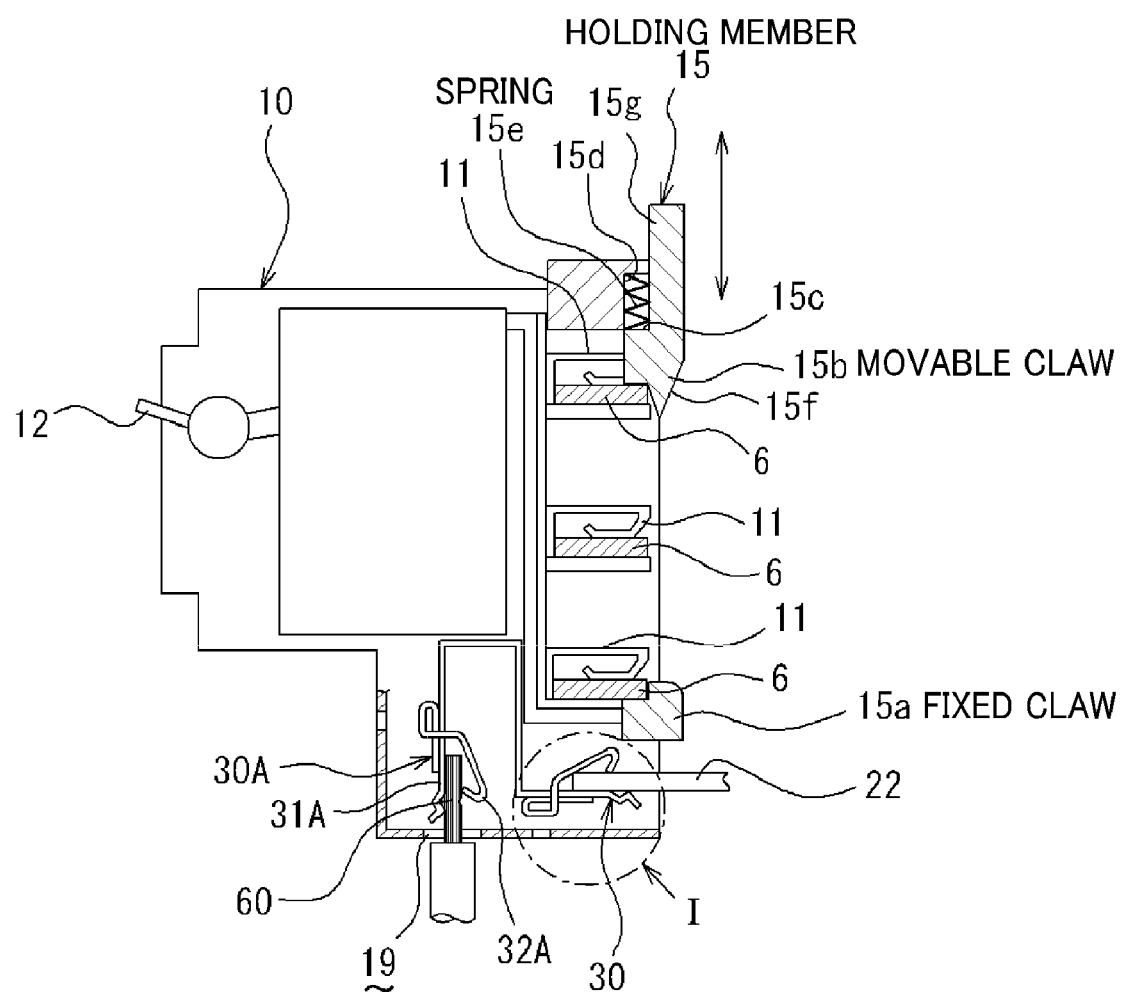
FIG. 8A is a schematic cross-sectional view of a breaker in accordance with the present disclosure.
Figure 8B:
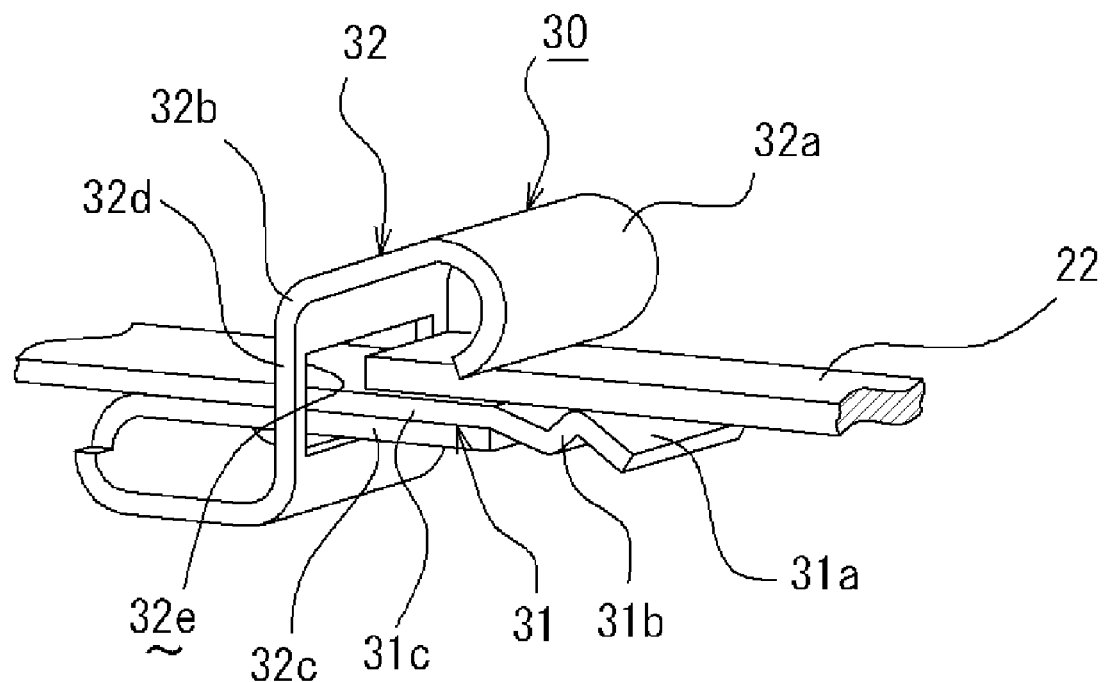
FIG. 8B is an enlarged perspective view of a portion I of FIG. 8A.

Furthermore, a plurality (three are illustrated in the drawings) of recess grooves 14 is provided parallel to each other in the joint surface 13 of the breaker 10. The clip-type terminal metal fittings 11 electrically connected with the busbars 6 are installed in the recess grooves 14. Moreover, a holding member 15 is installed in a direction orthogonal to a lengthwise direction of the recess groove 14 at a central part of the joint surface 13 to hold the busbars 6 within the recess grooves 14 at two ends by applying elastic force thereto. As illustrated in FIGS. 7 and 8A, the holding member 15 includes a fixed claw 15a, a movable claw 15b and a spring 15e. The fixed claw 15a is fixed at a lower part of the joint surface 13 of the breaker 10. The movable claw 15b is installed at an upper part of the joint surface 13 opposing to the fixed claw 15a, and the movable claw 15b can move up and down with respect to the fixed claw 15a. The spring 15e is compressed between an engaging step portion 15c provided at the movable claw 15b and a step portion 15d provided at the upper part of the joint surface 13 of the breaker 10. Further, the movable claw 15b has a narrow taper 15f at its lower end and a release piece 15g extended at its upper end.

By applying the elastic force of the spring 15e to the movable claw 15b toward the fixed claw 15a, the holding member 15 configured as stated above holds the plurality (three) of busbars 6 connected with each terminal metal fitting 11 and prevents the busbars 6 from being disjoined. In order to release the busbars 6, the movable claw 15b is moved upward against the elastic force of the spring 15e by pulling the release piece 15g.

As illustrated in FIGS. 5, 7, 8A and 8B, recesses 16 each having a rectangular shape are provided parallel to each other in a horizontal direction in plural positions, e.g., three positions at the lower part of the joint surface 13 of the breaker 10. Each of the recesses 16 receives therein a plug-in terminal metal fitting 30. The plug-in terminal metal fitting 30 includes a pair of clamp members 31 and 32 press-contacted by spring force. A lower clamp member 31 positioned at a lower part includes an inclined surface portion 31a bent downward at an outer front end thereof and a wavy portion 31b bent and extended from a base end of the inclined surface portion 31a. Meanwhile, an upper clamp member 32 positioned at an upper part includes a pressing portion 32a at an outer front end thereof, a bent portion 32b and a holding portion 32c. The pressing portion 32a having a substantially half-cylindrical shape is press-contacted with a flat portion 31c extended from a base end of the wavy portion 31b of the lower clamp member 31. The bent portion 32b is bent from a base end of the pressing portion 32a to have a substantially crank shape. The holding portion 32c is bent from a base end of the bent portion 32b toward its front end to be in contact with a lower surface of the flat portion 31c of the lower clamp member 31. Furthermore, a through-window 32e through which the lower clamp member 31 passes is provided at a vertical portion 32d of the bent portion 32b of the upper clamp member 32 (see FIG. 8B).

An insertion hole 18 for a release member (not shown) that releases the spring force of the plug-in terminal metal fitting 30 is provided at one side of the joint surface 13, i.e., at a bottom surface 17 of the breaker 10. In this case, the insertion hole 18 is positioned at a position on the bottom surface of the breaker 10, corresponding to the bent portion 32b of the upper clamp member 32. Accordingly, by inserting the release member such as a driver or a pin into the insertion hole 18 and pressing the bent portion 32b of the plug-in terminal metal fitting 30, the pressing portion 32a of the upper clamp member 32 is spaced apart from the lower clamp member 31 and thus a plug terminal 22 is disconnected.

Further, an opening 19 is provided at a part of the bottom surface of the breaker 10 and an auxiliary plug-in terminal metal fitting 30A is installed inside the opening 19. The auxiliary plug-in terminal metal fitting 30A has the same configuration as the plug-in terminal metal fitting 30, i.e., it includes a pair of clamp members 31A and 32A press-contacted by spring force. The auxiliary plug-in terminal metal fitting 30A is electrically connected with a terminal 60 of another electric device (not illustrated) (see FIG. 5). Furthermore, an insertion hole 18A for a release member (not shown) that releases the spring force of the auxiliary plug-in terminal metal fitting 30A is provided at a lower part of the front surface portion of the breaker 10.

The plug terminal 22, which is inserted between the clamp members 31 and 32 of the plug-in terminal metal fitting 30 installed at the breaker 10, is provided at a lower part of the joint surface 21 of the electric device 20. The plug terminal 22 has a plate-shaped rod terminal piece 22a. When joining the breaker 10 with the electric device 20, the terminal piece 22a is inserted between the clamp members 31 and 32 of the plug-in terminal metal fitting 30 against the elastic force.

Further, a rectangular case 22b protrudes from the joint surface 21 of the electric device 20 to surround and protect the plug terminal 22. The case 22b is configured to be detachably fitted and inserted into the recess 16 which receives the plug-in terminal metal fitting 30 of the breaker 10. When the breaker 10 is joined with the electric device 20, the case 22b is fitted and inserted into the terminal metal fitting receiving recess 16, whereby the breaker 10 is firmly joined with the electric device 20.

Figure 9A:
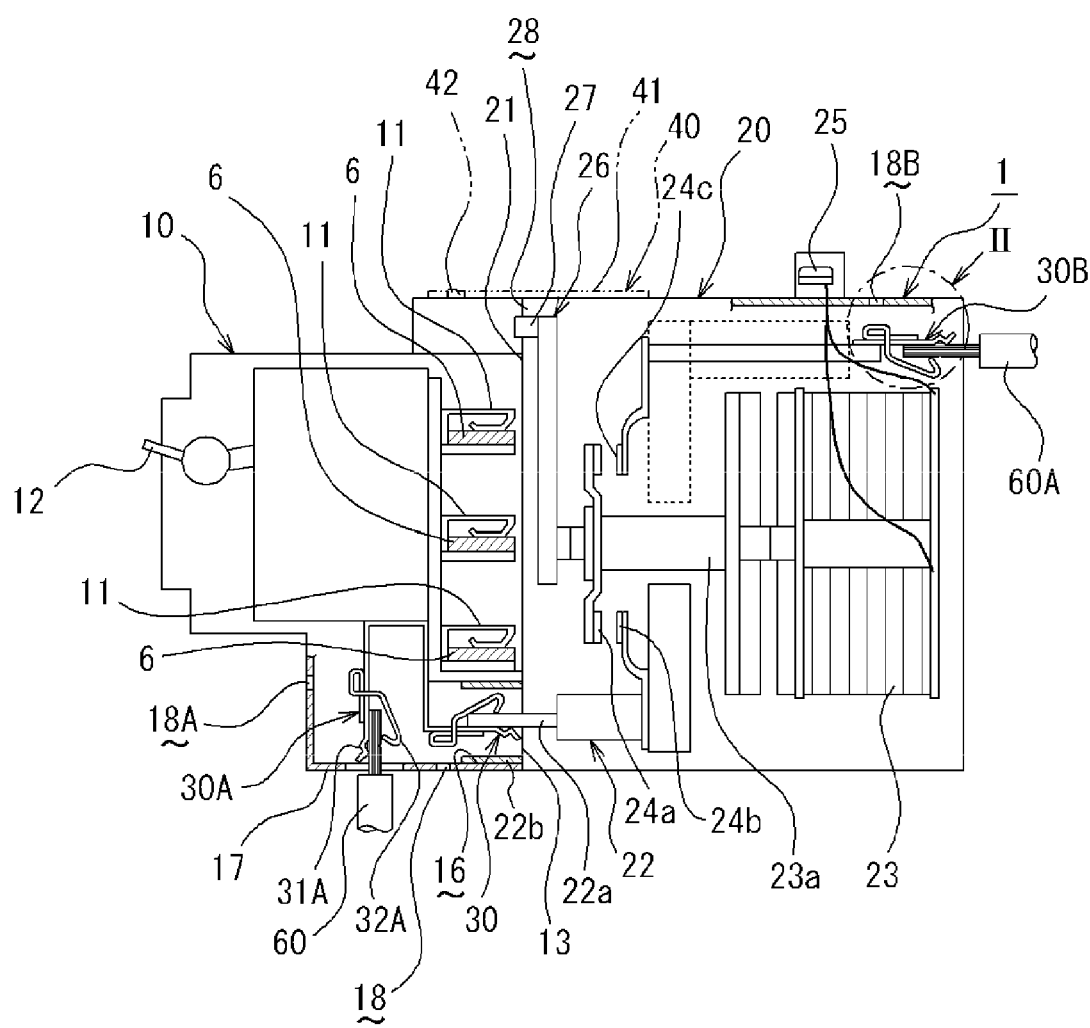
FIG. 9A is a schematic cross-sectional view showing a connection state between an external terminal and a plug-in terminal metal fitting of the electric device in accordance with the present disclosure.
Figure 9B:
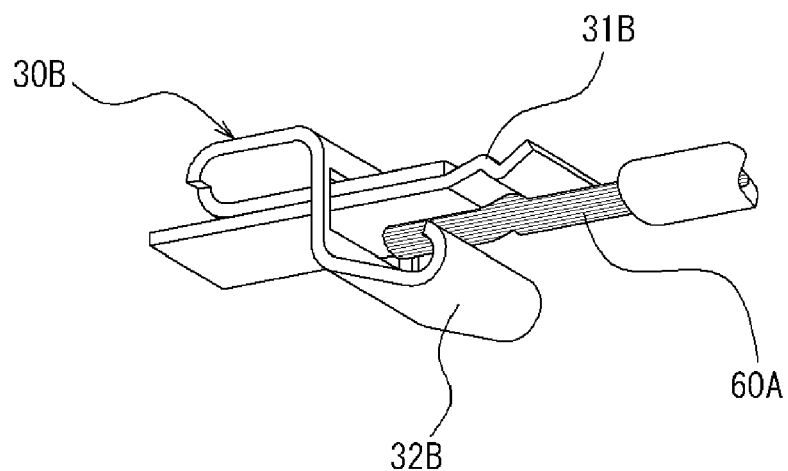
FIG. 9B is an enlarged perspective view of a portion II of FIG. 9A.
Figure 10:
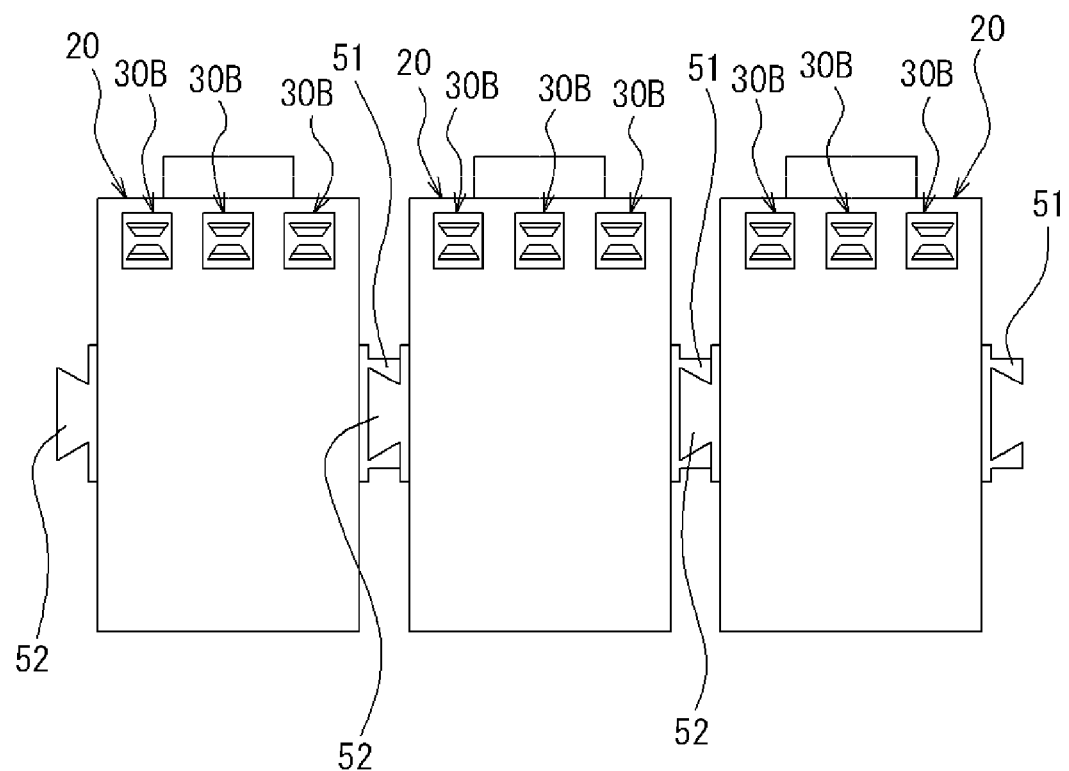
FIG. 10 is a schematic rear view showing a coupling state between the electric devices in accordance with the present disclosure.

In this case, the plug terminal 22 is installed at one contact point 24b of output contact points 24b and 24c electrically connected with a movable contact point 24a which is operated by exciting an electric coil 23 through electric conduction. The electric coil 23 is installed horizontally in the electric device 20. The other contact point 24c is connected with a plug-in terminal metal fitting 30B installed at a rear part of the electric device 20. The plug-in terminal metal fitting 30B has the same configuration as the plug-in terminal metal fitting 30 installed in the breaker 10, and, thus same components will be assigned same reference numerals and the explanation thereof will be omitted. Further, the plug-in terminal metal fitting 30B is installed at an upper rear part of the electric device 20, and an insertion hole 18B for a release member (not shown) that releases spring force of the plug-in terminal metal fitting 30B is provided at a top surface near the rear surface of the electric device 20. A terminal or a wire 60A of another electric device (not shown) is electrically connected to the plug-in terminal metal fitting 30B (see FIGS. 9A and 9B). With this configuration, the release member to be inserted into the insertion hole is pressed down to the plug-in terminal metal fitting against the spring force of the plug-in terminal metal fitting while the plug-in terminal metal fitting is connected (engaged) with the plug terminal, whereby it is possible to release the connection (engagement) between the plug-in terminal metal fitting and the plug terminal. Further, a terminal 25 of the electric coil 23 is installed at the top surface of the electric device 20.

An electric conduction checking member 26 for informing an electric conduction state of the electric device 20 is coupled to the movable contact point 24a operated by the excitation of the electric coil 23 when the electric device 20 is electrically conducted. The electric conduction checking member 26 is connected with the movable contact point 24a at its lower portion and it stands upward within the electric device 20, and a checking indicator 27 is provided at an upper portion surface of the electric conduction checking member 26. The electric conduction checking member 26 configured as described above is moved in a horizontal direction of the electric device 20 along with the movable contact point 24a which makes contact with or separates from an end portion of a core (iron core) 23a of the electric coil 23 installed horizontally in the electric device 20. Therefore, the checking indicator 27 appears or disappears through an opening 28 provided at a front surface of the electric device 20, so that whether the electric device 20 is electrically conducted can be checked. Further, a checking window 29 may be provided at a side surface of the electric device 20, and a second electric conduction checking member 26A, which has a checking indicator and can move in the checking window 29, may be coupled to the movable contact point 24a (see FIG. 3 and FIGS. 6A to 6C).

Installed at upper end portions of the joint surface 13 of the breaker 10 and the joint surface 21 of the electric device 20 is an engaging member 40 including an engaging unit 41 and engagement receiving units 42, for detachably engaging (coupling) the breaker 10 with the electric device 20. In this case, as illustrated in FIG. 3, FIGS. 4A and 4B and FIGS. 6A to 6C, the engaging unit 41 is made of, e.g., a steel plate having elasticity and includes a fixing piece 43 having a rectangular shape, a pair of engaging pieces 44 and engagement holes 45 having a laterally extended slit-shape. The fixing piece 43 is made of the same material as that of a case of the electric device 20 and is integrally formed or thermally bonded therewith at the upper end portion of the joint surface 21 of the electric device 20. The pair of engaging pieces 44 horizontally protrude forward from both ends of a front side of the fixing piece 43. The engagement holes 45 are provided to penetrate front end portions of the two engaging pieces 44. Further, the engagement receiving units 42 are slightly smaller than the slit-shaped engagement holes 45. The engagement receiving unit 42 has an inclined surface 46 on a surface facing the engaging unit 41, so that a cross section thereof is substantially triangle-shaped. The engagement receiving units 42 are positioned at right and left positions on the top surface of the breaker 10 near the side of the joint surface 13.

In the engaging member 40 configured as described above, when joining the breaker 10 with the electric device 20, the engaging pieces 44 of the engaging unit 41 are elastically deformed and move over the inclined surfaces 46 of the engagement receiving units 42, so that the slit-shaped engagement holes 45 are engaged with the engagement receiving units 42. Accordingly, the slit-shaped engagement holes 45 of the engaging unit 41 are engaged with the engagement receiving units 42 by a so-called snap engagement, whereby the breaker 10 and the electric device 20 can be engaged (coupled) with each other in a one-touch manner. Meanwhile, in order to release the engagement (coupling) between the breaker 10 and the electric device 20, the engaging pieces 44 of the engaging unit 41 is moved upward, so that the engagement between the slit-shaped engagement holes 45 and the engagement receiving units 42 can be released. With this configuration, the joint surface of the breaker is brought in direct contact with the joint surface of the electric device, whereby the plug-in terminal metal fitting of the breaker can be electrically connected with the plug terminal of the electric device, and the breaker can be detachably joined to the electric device by the engaging member.

In the above description, the engaging unit 41 is installed in the electric device 20 and the engagement receiving units 42 are installed in the breaker 10, but they may be installed in a reverse way. That is, the engaging unit 41 may be installed at the upper end portion of the joint surface 13 of the breaker 10 and the engagement receiving units 42 may be installed at the upper end portion of the joint surface 21 of the electric device 20. With this configuration, while the breaker is brought in direct contact with the electric device, the plug-in terminal metal fitting is connected with the plug terminal at one end of the joint surface, and the breaker and the electric device are fixed to each other by the engaging member at the other end of the joint surface. Alternatively, the engaging member 40 may be installed at both the lower and upper end portions of the joint surface 13 of the breaker 10 and the joint surface 21 of the electric device 20. In this way, the breaker 10 can be more firmly joined (coupled) with the electric device 20.

Provided on right and left side surfaces 20a and 20b of the electric device 20 are a recess-shaped coupling unit 51 and a protrusion-shaped coupling unit 52, detachably engaged with each other. That is, as illustrated in FIGS. 4A and 4B, FIGS. 6A to 6C, FIG. 7 and FIG. 10, the recess-shaped coupling unit 51 having a narrow taper-shaped opening 53 elongated in a forward/backward direction is provided at one side surface, e.g., the left side surface 20a of the electric device 20. Further, the protrusion-shaped coupling unit 52 having a wide taper-shaped head 54 slidably insert-fitted into the opening 53 of the recess-shaped coupling unit 51 is provided at the other side surface, e.g., the right side surface 20b thereof.

As described above, the recess-shaped coupling unit 51 and the protrusion-shaped coupling unit 52, detachably engaged with each other, are provided on the right and left side surfaces 20a and 20b of the electric device 20, so that the electric device 20 can be detachably coupled with an adjacent electric device 20 by engaging (slide insert-fitting) the recess-shaped coupling unit 51 of the adjacent electric device 20 with the protrusion-shaped coupling unit 52 of the electric device 20. Accordingly, when installing plural electric devices 20, the electric devices 20 can be simply coupled with each other without using a separate coupling member.

Figure 11A:
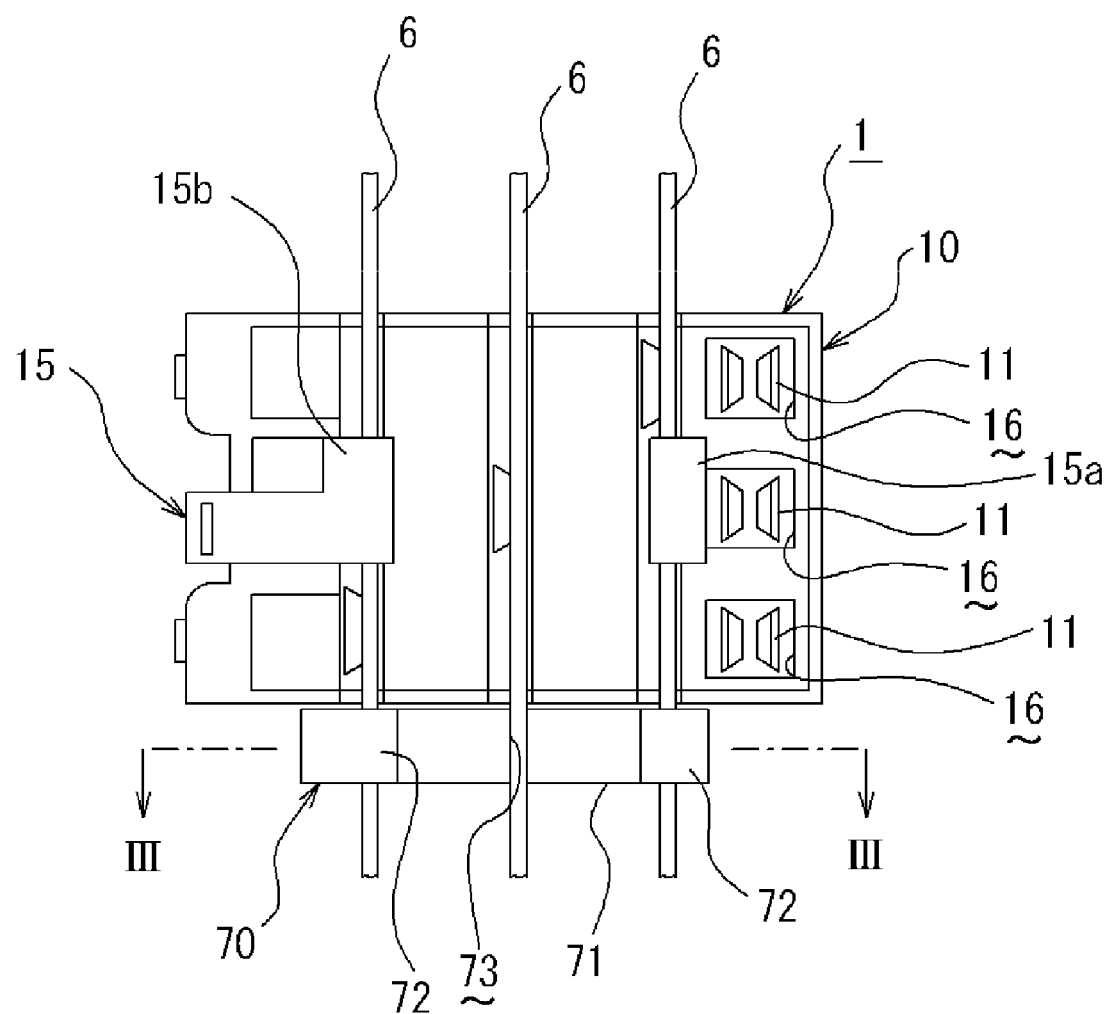
FIG. 11A is a rear view showing a state where a stopper that prevents busbars from being disjoined is installed when the plug-in unit in accordance with the present disclosure is vertically installed.
Figure 11B:
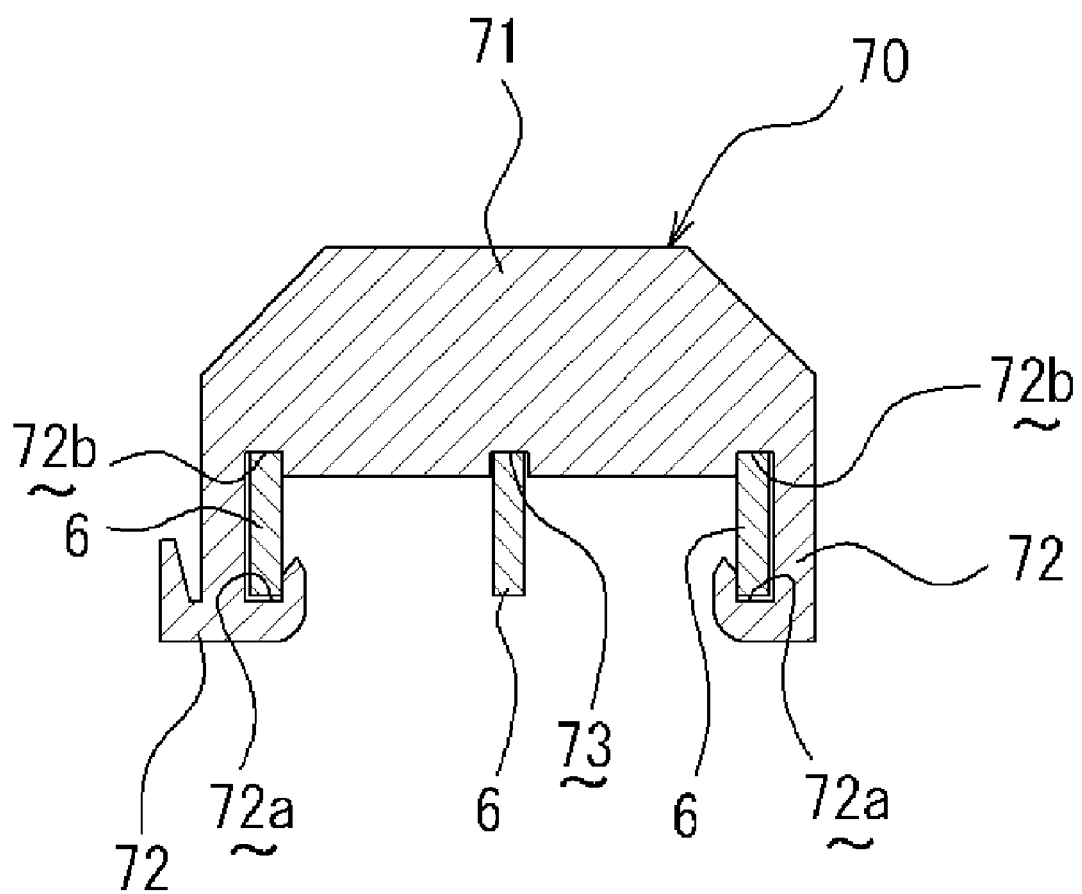
FIG. 11B is a cross-sectional view taken along line III-III of FIG. 11A.

When the plug-in units 1 are arranged in a longitudinal direction (vertical direction), there is a risk that the busbars 6 may be disjoined. Therefore, as illustrated in FIGS. 11A and 11B, it is desirable to install a stopper 70 at a position near a lower portion of the lowermost plug-in unit 1 to hold the busbars 6. In this case, the stopper 70 includes a base 71 positioned at one end of each busbar 6, a pair of elastically deformable holding claws 72 protruded from both ends of one side of the base 71, for holding the busbars 6 at both ends, and a holding groove 73 provided in a central portion of one side of the base 71, for holding one end portion of the central busbar 6. Further, a pair of holding grooves 72a and 72b for holding the busbars 6 in cooperation with each other are provided at a front end portion and a base end portion of the holding claws 72, which are facing each other.

The busbars 6 can be prevented from being disjoined by using the stopper 70 configured as described above. Even in case that the plug-in units 1 are arranged in a lateral direction (horizontal direction), the stopper 70 may be installed near an outer side of the outermost plug-in unit 1, so that it is possible to prevent the busbars 6 from being laterally disjoined.

Hereinafter, there will be explained a sequence of installing (wiring) the plurality of breakers 10 and electric devices 20 configured as described above in the distribution panel 2.

First, three busbars 6 electrically connected with the main breaker 5 fixed to the fixing base 3 of the distribution panel 2, are electrically connected with the terminal metal fittings 11 installed in the recess grooves 14 of each breaker 10, and the holding member 15 holds the three busbars 6 to prevent them from being disjoined. In this way, the busbars 6 can be electrically connected with a desired breaker 10.

Subsequently, the joint surface 13 of the breaker 10 connected with the busbars 6 is brought into contact with the joint surface 21 of the electric device 20, and the plug-in terminal metal fitting 30 of the breaker 10 is electrically connected with the plug terminal 22 of the electric device 20. Further, the engaging unit 41 and the engagement receiving units 42 of the engaging member 40, which are provided at the joint surface 13 of the breaker 10 and the joint surface 21 of the electric device 20, are engaged with each other, so that the breaker 10 is joined (coupled) with the electric device 20. In this manner, each breaker 10 is joined (coupled) with each electric device 20.

Since the breaker 10 and the electric device 20 installed (wired) as described above are physically connected (coupled) with each other by the busbars 6 having stiffness, they can be installed (wired) in the distribution panel 2 without using a fixing member.

Further, when releasing the joint (coupling) between the breaker 10 and the electric device 20 to separate them, the release member such as a driver or a pin is inserted into the insertion hole 18 in the bottom surface of the breaker 10 so as to release the clamping state of the plug terminal 22 by the clamp members 31 and 32 of the plug-in terminal metal fitting 30. Then, the engagement between the engaging unit 41 and the engagement receiving units 42 of the engaging member 40 is released, so that the breaker 10 can be separated from the electric device 20.

In the above-described embodiment, the breaker 10 is joined (coupled) to one electric device 20, but it can be joined (coupled) to a plurality of electric devices 20 and 20A. That is, the plug-in terminal metal fitting 30B installed at a rear side joint surface 21A opposing the joint surface 21 of the electric device 20 at the side of the breaker 10 may be electrically connected with a plug terminal 22A installed at a front side joint surface 21A of a second electric device 20A such as a magnet conductor having the same function as the electric device 20. Further, the electric device 20 may be detachably joined (coupled) with the second electric device 20A by a second engaging member 40A installed at the rear side joint surface 21A of the electric device 20 and the front side joint surface 21B of the second electric device 20A.

In this case, (recesses 16 each having a rectangular shape are provided parallel to each other in a horizontal direction in three positions at an upper part of the rear side joint surface 21A of the electric device 20, and the plug-in terminal metal fitting 30B is installed (received) in each recess 16. Further, three plug terminals 22A each capable of being connected with the plug-in terminal metal fitting 30B are installed at three positions at an upper part of the front side joint surface 21B of the second electric device 20A.

Furthermore, the rectangular case 22b protrudes from the front side joint surface 21B of the second electric device 20A to surround and protect the plug terminal 22A. The case 22b is configured to be detachably fitted and inserted into the recess 16 which receives the plug-in terminal metal fitting 30B of the electric device 20. When the electric device 20 is joined with the second electric device 20A, the case 22b is fitted and inserted into the recess 16, whereby the electric device 20 is firmly joined with the second electric device 20A.

Moreover, like the engaging member 40, a second engaging member 40A having an engaging unit 41 and engagement receiving units 42, which are detachably engaged with each other, is installed at lower end portions of the rear side joint surface 21A of the electric device 20 and the front side joint surface 21B of the second electric device 20A. Alternatively, the second engaging member 40A may be installed at both the lower end portions and the upper end portions of the rear side joint surface 21A of the electric device 20 and the front side joint surface 21B of the second electric device 20A. In this way, the electric device 20 can be firmly joined (coupled) with the second electric device 20A.

With this configuration, the rear side joint surface 21A of the electric device 20 is brought into contact with the front side joint surface 21B of the second electric device 20A, and the plug-in terminal metal fitting 30B of the electric device 20 is electrically connected with the plug terminal 22A of the second electric device 20A. Further, the engaging unit 41 and the engagement receiving units 42 of the second engaging member 40A, which are installed at the joint surfaces 21A and 21B of the electric device 20 and the second electric device 20A, are engaged with each other, so that the electric device 20 can be joined (coupled) with the second electric device 20A. In this case, the plug terminal 22A is installed at one contact point 24f of output contact points 24e and 24f electrically connected with a movable contact point 24d which is operated by exciting an electric coil 23A through electric conduction. The electric coil 23A is installed horizontally in the second electric device 20A.

Further, a plug-in terminal metal fitting 30C having the same configuration as the plug-in terminal metal fitting 30B is installed at a lower end part of a rear surface opposing the front side joint surface 21B of the second electric device 20A. A wire or a plug terminal of another electric device (not illustrated) can be electrically connected to the plug-in terminal metal fitting 30C. Furthermore, an insertion hole 18C for a release member (not illustrated) that releases spring force of the plug-in terminal metal fitting 30C is provided at a bottom surface near the rear side of the second electric device 20A. In this case, the release member to be inserted into the insertion hole is pressed down to the plug-in terminal metal fitting against the spring force of the plug-in terminal metal fitting while the plug-in terminal metal fitting is connected (engaged) with the plug terminal of the other electric device, whereby it is possible to release the connection (engagement) between the plug-in terminal metal fitting and the plug terminal.

Figure 12:
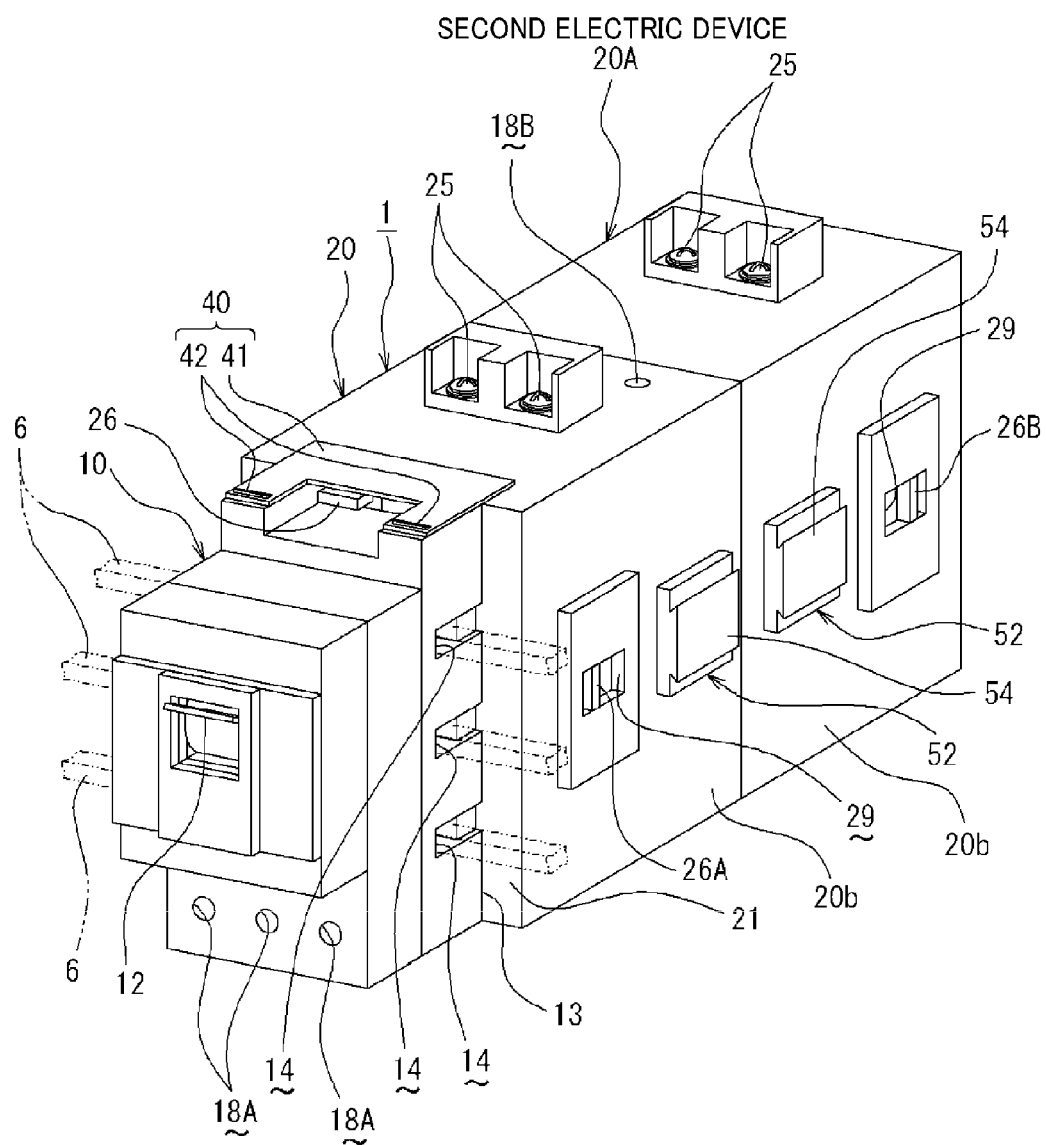
FIG. 12 is a schematic perspective view showing a plug-in unit in accordance with a second embodiment of the present disclosure.
Figure 13A:
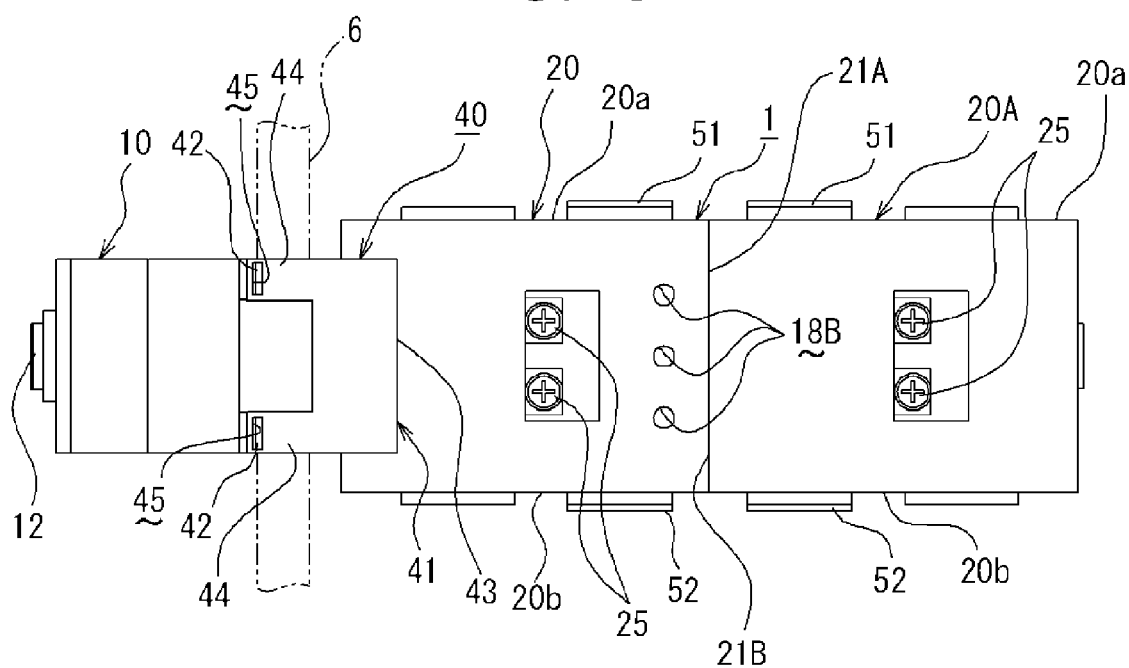
FIG. 13A is a plane view of the plug-in unit of the second embodiment.
Figure 14:
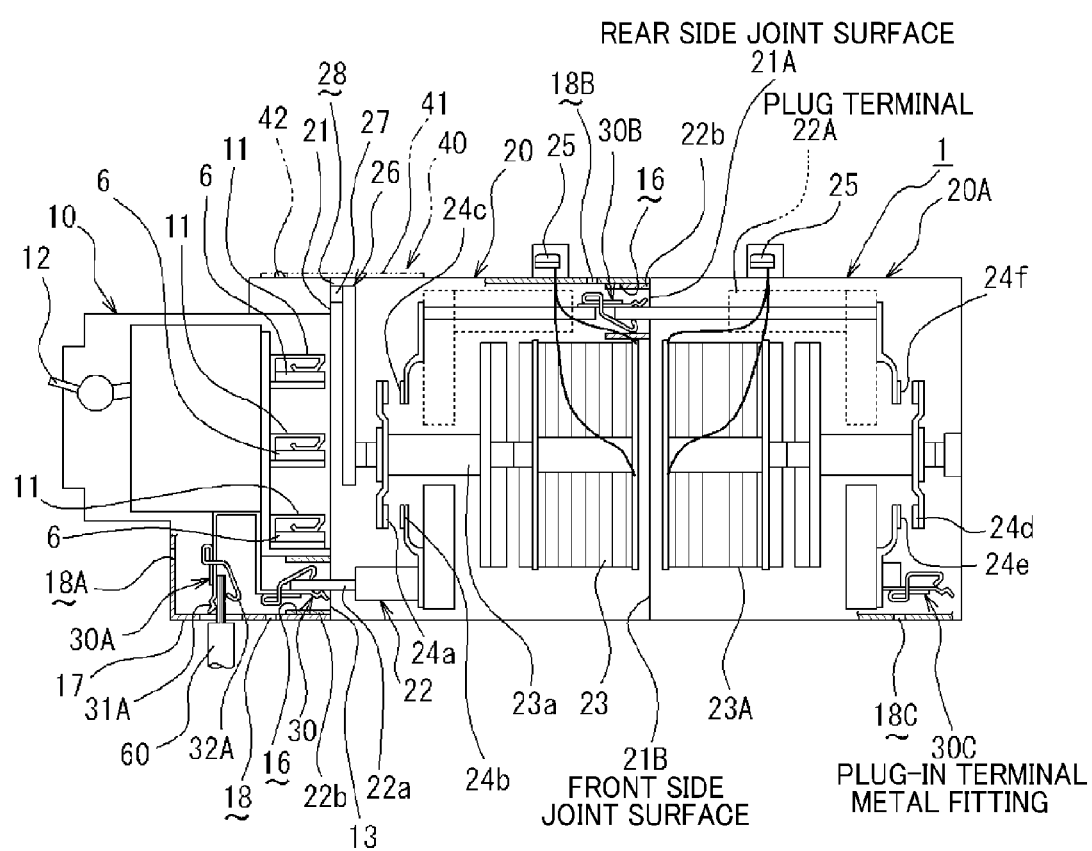
FIG. 14 is a schematic cross-sectional view of the plug-in unit of the second embodiment.
Figure 15:
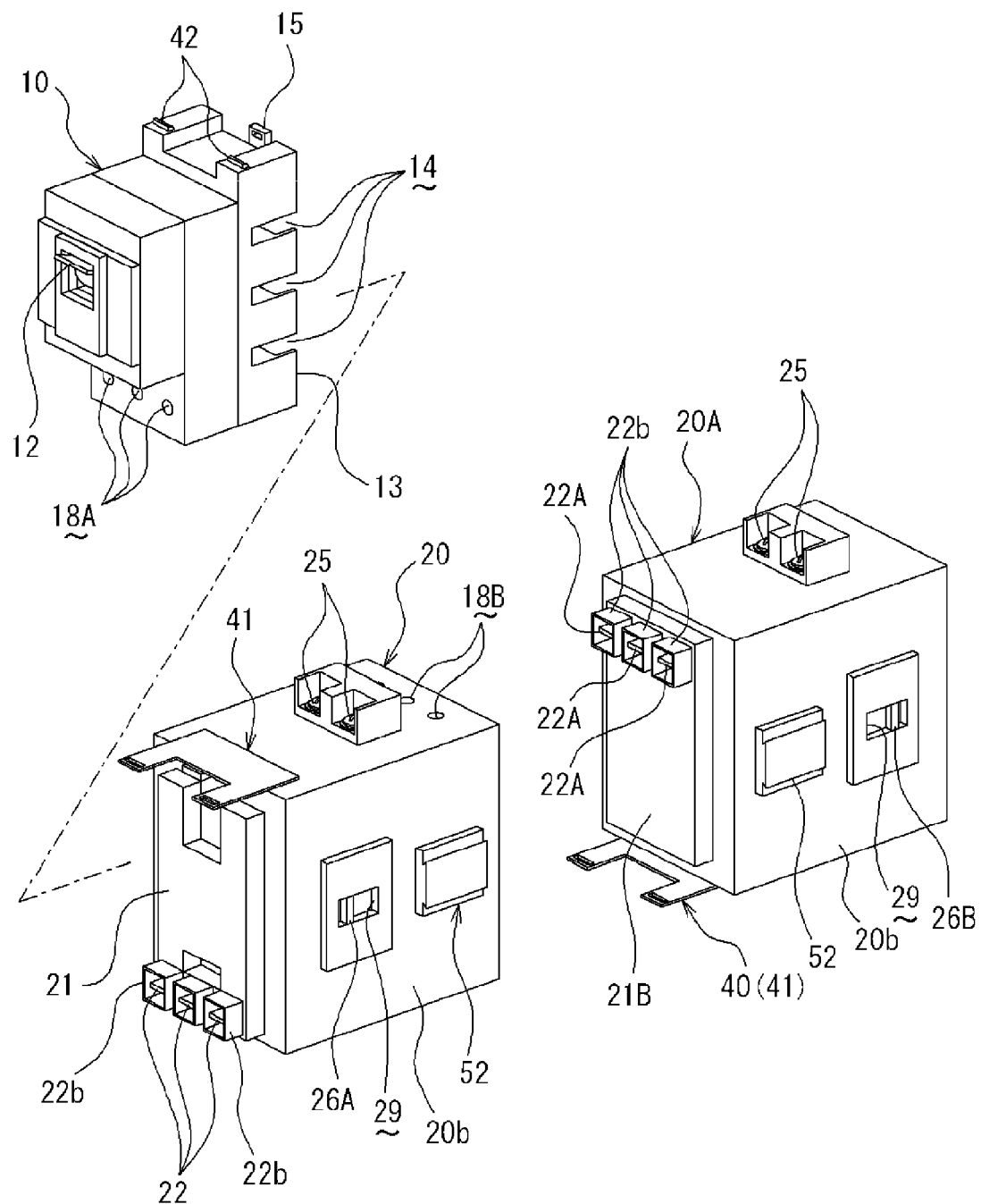
FIG. 15 is an exploded perspective view showing a front side of the plug-in unit of the second embodiment.
Figure 16:
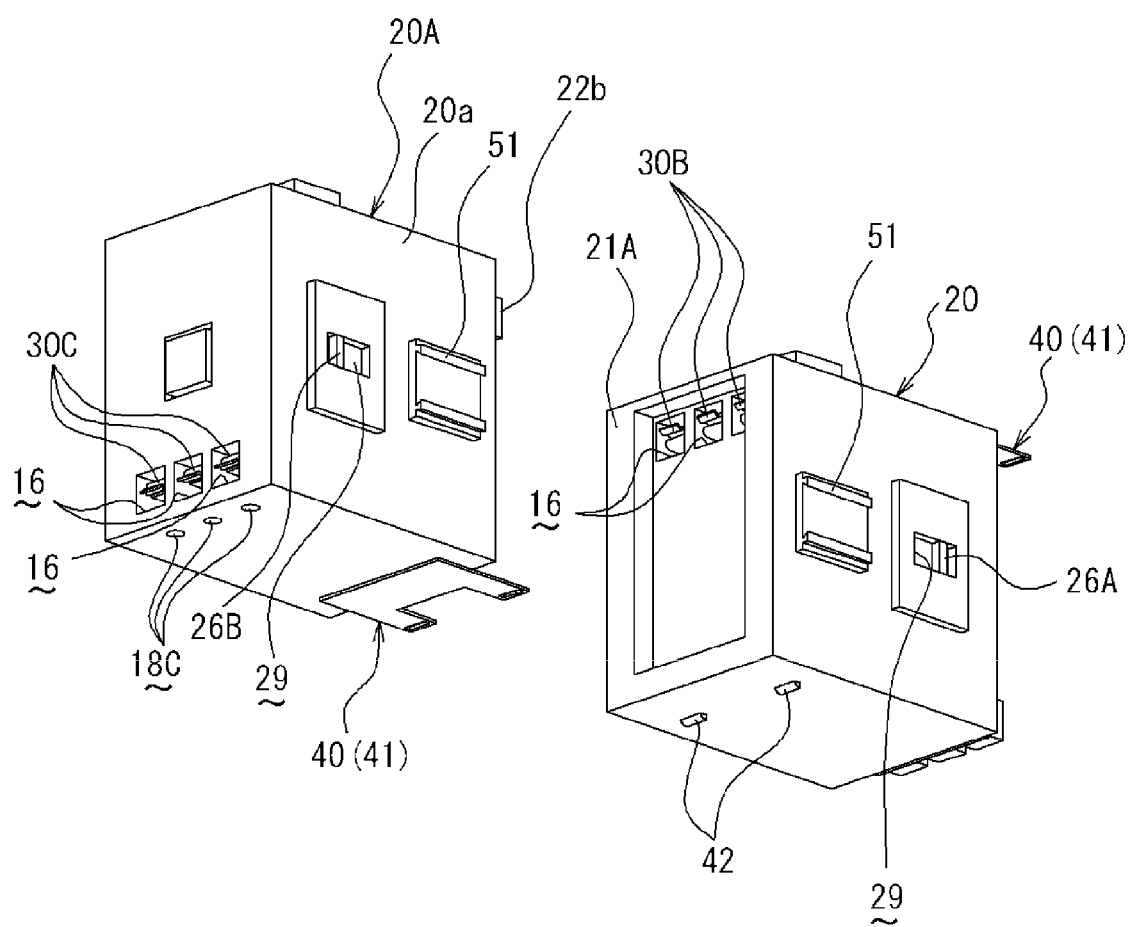
FIG. 16 is an exploded perspective view showing rear sides of an electric device and a second electric device of the plug-in unit of the second embodiment.

Moreover, a checking window 29 is provided at a side surface of the second electric device 20A. A third electric conduction checking member 26B, which has a checking indicator and can move in the checking window 29, is coupled to the movable contact point 24d of the electric coil 23A embedded in the second electric device 20A, whereby whether the second electric device 20A is electrically conducted can be checked (see FIG. 12 and FIGS. 13A and 13B).

As illustrated in FIGS. 13A and 13B, FIG. 15 and FIG. 16, like the electric device 20, a recess-shaped coupling unit 51 and a protrusion-shaped coupling unit 52, detachably engaged with each other, are provided on right and left side surfaces 20a and 20b of the second electric device 20A, so that the second electric device 20A can be detachably coupled with an adjacent second electric device 20A by engaging (slide insert-fitting) the recess-shaped coupling unit 51 of the adjacent second electric device 20A with the protrusion-shaped coupling unit 52 of the second electric device 20A. Accordingly, when installing plural second electric devices 20A, the second electric devices 20A can be simply coupled with each other without using a coupling member.

Further, the plug-in unit of the second embodiment as shown in FIGS. 13A to 16 includes the same components as those of the first embodiment except for the components described separately, and thus they will be assigned same reference numerals and the explanation thereof will be omitted.

As described above, by joining the electric device 20 with the second electric device 20A, even if one electric device fails to operate, the other electric device operates, so that an electric system can be maintained.

In the above-described embodiment, the connection part of the busbars 6, i.e., the plurality (three are illustrated in the drawings) of recess grooves 14, in which the clip-type terminal metal fittings 11 electrically connected with the busbars 6 are installed, are provided at the joint surface 13 of the breaker 10. However, the connection part of the busbars 6 may be provided on the top surface 80 of the breaker 10.

Figure 17:
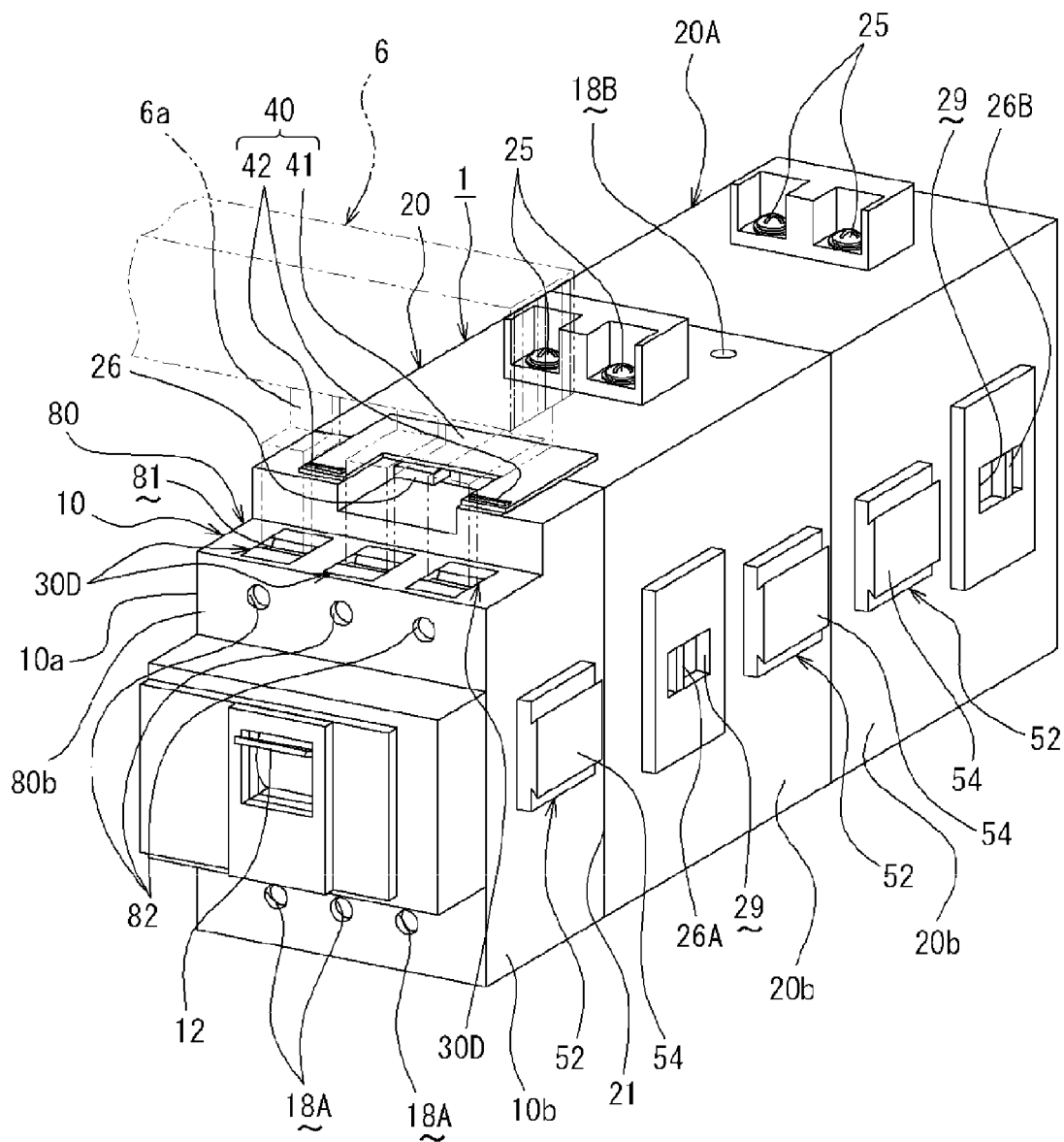
FIG. 17 is a schematic perspective view of a plug-in unit in accordance with a third embodiment of the present disclosure.
Figure 18:
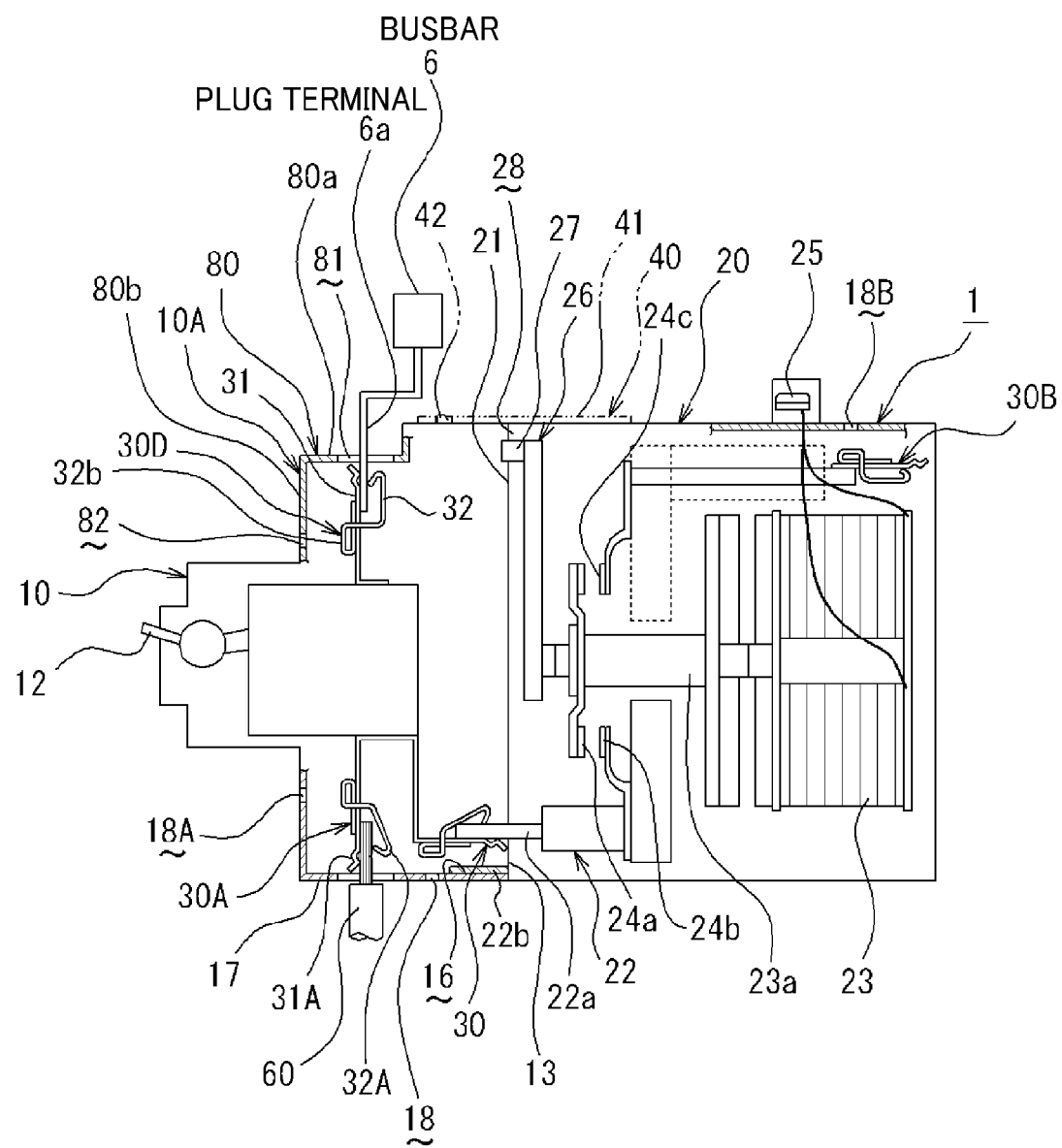
FIG. 18 is a schematic cross-sectional view showing a joint state between a breaker and an electric device in accordance with the third embodiment.

That is, as illustrated in FIGS. 17 and 18, a plurality (three are illustrated in the drawings) of plug-in terminal metal fittings 30D for the busbars may be installed on the same line at the top surface 80 of the breaker 10, and each plug-in terminal metal fitting 30D may be connected with a plug terminal 6a protruded from the busbar 6.

In this case, the top surface 80 of a case 10A of the breaker 10 has a step shape, and the plug-in terminal metal fitting 30D is installed in the case 10A so as to face toward an opening 81 provided in a horizontal surface portion 80a. The plug-in terminal metal fitting 30D has the same configuration as the plug-in terminal metal fitting 30, and it includes a pair of clamp members 31 and 32 press-contacted by spring force. Since the plug-in terminal metal fitting 30D has the same configuration as the plug-in terminal metal fitting 30, same parts will be assigned same reference numerals and the explanation thereof will be omitted.

Further, an insertion hole 82 for a release member (e.g., a driver or a pin) that releases the spring force of the plug-in terminal metal fitting 30D is provided at a front surface opposing the joint surface 13 of the breaker 10, i.e., at a vertical surface 80b on the front side near the horizontal surface portion 80a of the top surface 80. The release member such as the driver or the pin is inserted into the insertion hole 82 to press a bent portion 32b of the plug-in terminal metal fitting, so that a connection with the plug terminal 6a of the busbar 6 is released. With this configuration, the release member to be inserted into the insertion hole is pressed down to the plug-in terminal metal fitting against the spring force of the plug-in terminal metal fitting while the plug-in terminal metal fitting is connected (engaged) with the plug terminal of the busbar, whereby it is possible to release the connection (engagement) between the plug-in terminal metal fitting and the plug terminal.

Further, a recess-shaped coupling unit (not illustrated) and a protrusion-shaped coupling unit 52, detachably engaged with each other, are provided at right and left side surfaces 10a and 10b of the breaker 10, in the same manner as the electric device 20. That is, the recess-shaped coupling unit (not illustrated) having a narrow taper-shaped opening elongated in a forward/backward direction is provided at one side surface, e.g., the left side surface 10a of the breaker 10. Further, the protrusion-shaped coupling unit 52 having a wide taper-shaped head 54 slidably insert-fitted into the opening of the recess-shaped coupling unit is provided at the other side surface, e.g., the right side surface 10b thereof.

Figure 19:
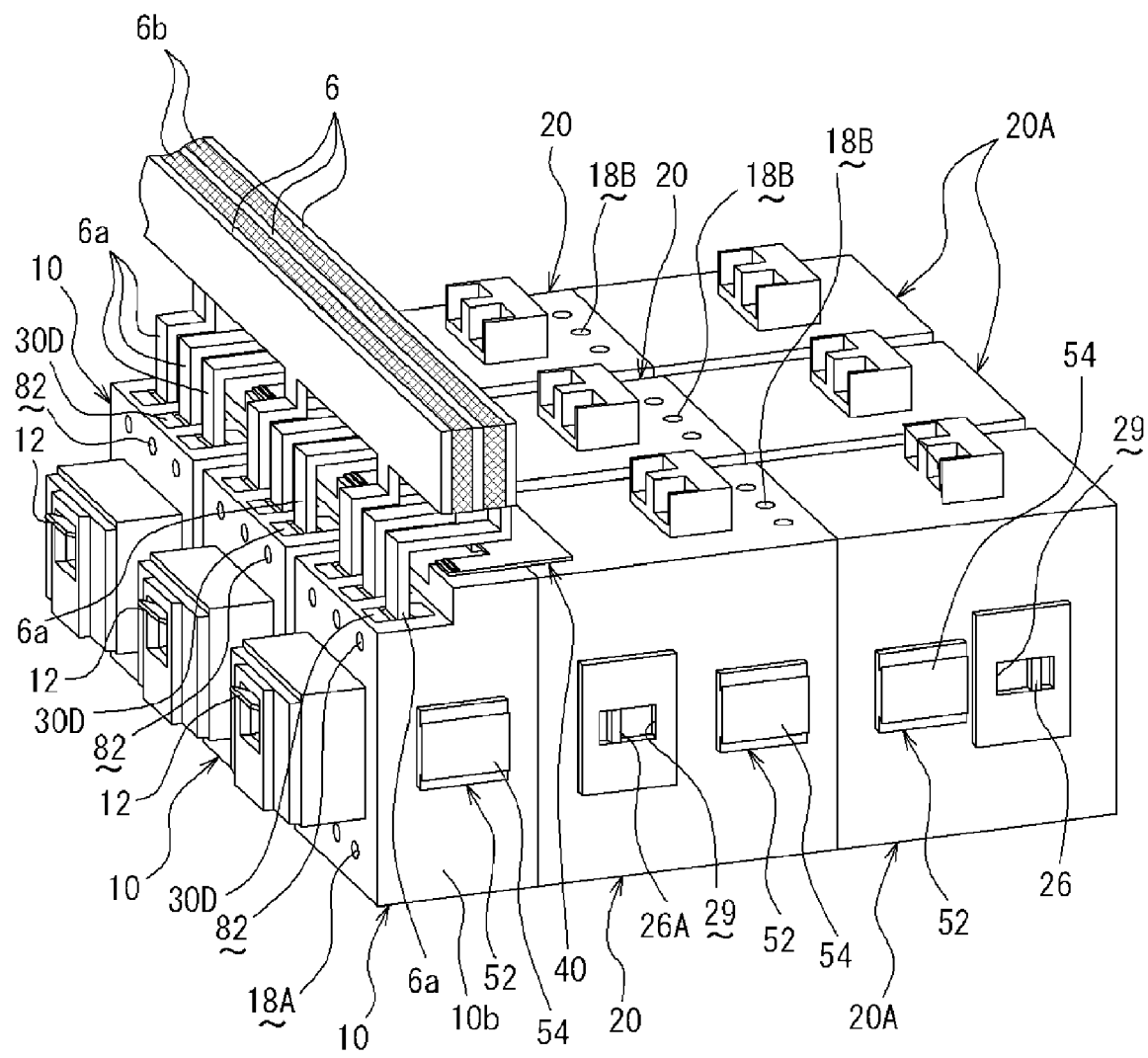
FIG. 19 is a schematic perspective view showing a state where the breakers and the electric devices are connected in plural rows in accordance with the third embodiment.

As described above, the recess-shaped coupling unit and the protrusion-shaped coupling unit 52, detachably engaged with each other, are provided on the right and left side surfaces 10a and 10b of the breaker 10, so that the breaker 10 can be detachably coupled with an adjacent breaker 10 by engaging (slide insert-fitting) the recess-shaped coupling unit of the adjacent breaker 10 with the protrusion-shaped coupling unit 52 of the breaker 10. Accordingly, when installing plural breakers 10, the breakers 10 can be simply coupled with each other without using a coupling member (see FIG. 19).

Figure 20A:
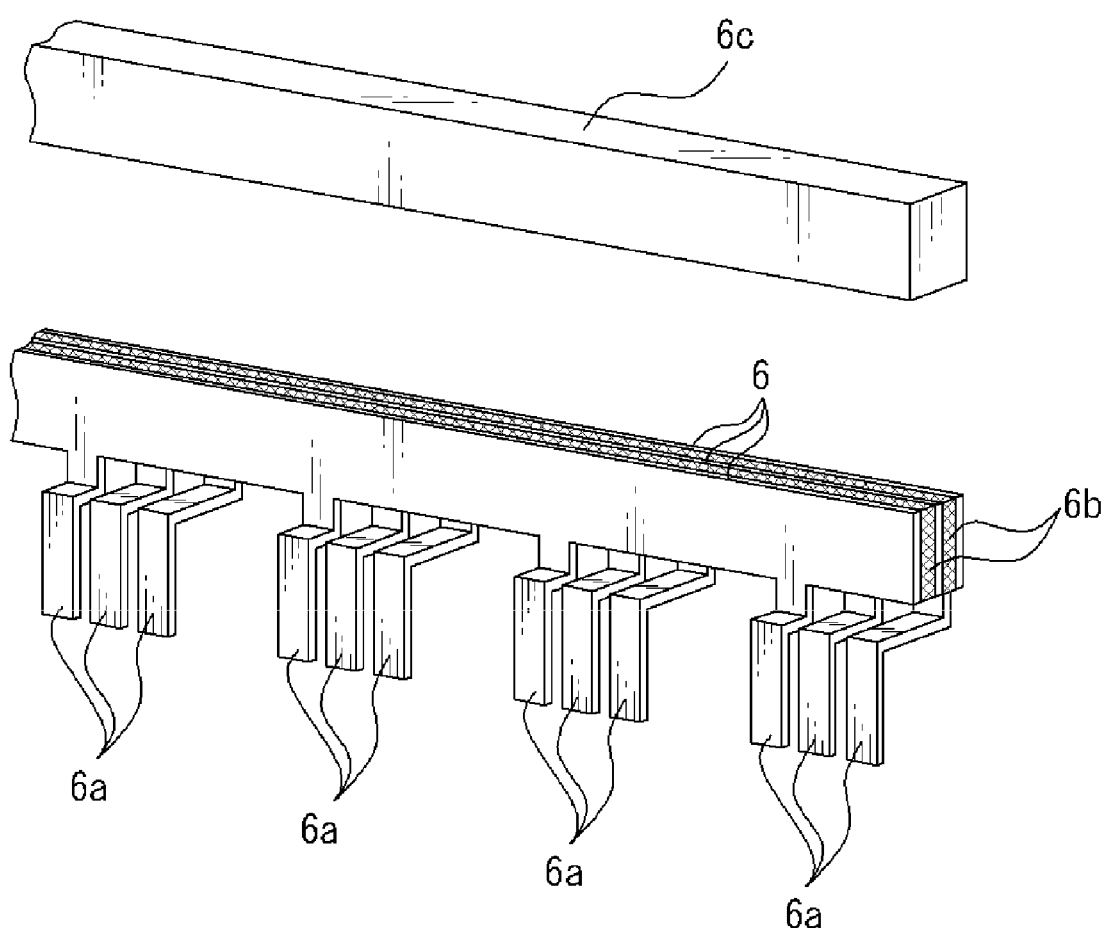
FIGS. 20A and 20B are exploded perspective views showing busbars connected to the plug-in unit of the third embodiment at different positions.
Figure 20B:
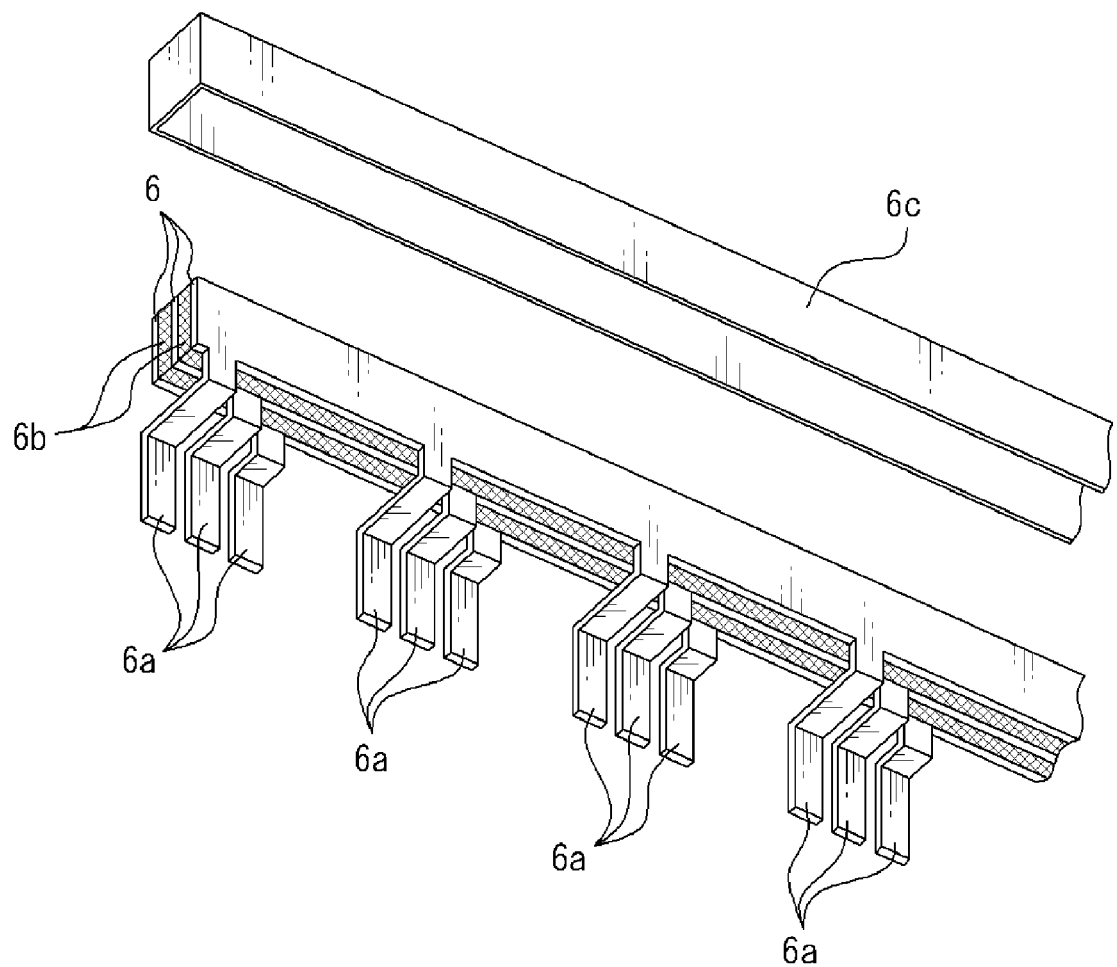

Further, each of the plurality (e.g., three) of busbars 6 connected with the plug-in terminal metal fitting 30D installed at the top surface 80 of the breaker 10 includes the plug terminal 6a having a plate shape vertically suspended in a crank shape at its lower end portion. Alternatively, the plug terminal 6a may not have a plate shape vertically suspended in a crank shape, but it may have, e.g., a cable shape or a rod shape. As illustrated in FIGS. 20A and 20B, the plurality of busbars 6 is multilayered in a horizontal direction with plate-shaped insulators 6b made of synthetic resin interposed therebetween. Further, top surfaces and right and left surfaces of all the busbars 6 are coated with an insulating cover 6c, made of synthetic resin and having a cross-section of a substantially C-shape. In this manner, the plurality of busbars 6 is multilayered with the plate-shaped insulators 6b interposed therebetween, and the top surfaces and the right and left surfaces of all the busbars 6 are coated with the insulating cover 6c, so that there is no need to secure a space insulation distance between the busbars 6, and there is no need for a protection structure against an electric shock.

As described above, since the plug-in terminal metal fitting 30D for the busbars is installed at the top surface 80 of the breaker 10, the structure of the joint surface 13 of the breaker 10 can be simplified. Further, the busbars 6 can be connected with the breaker 10 after the breaker 10 is joined with the electric device 20.

Figure 21:
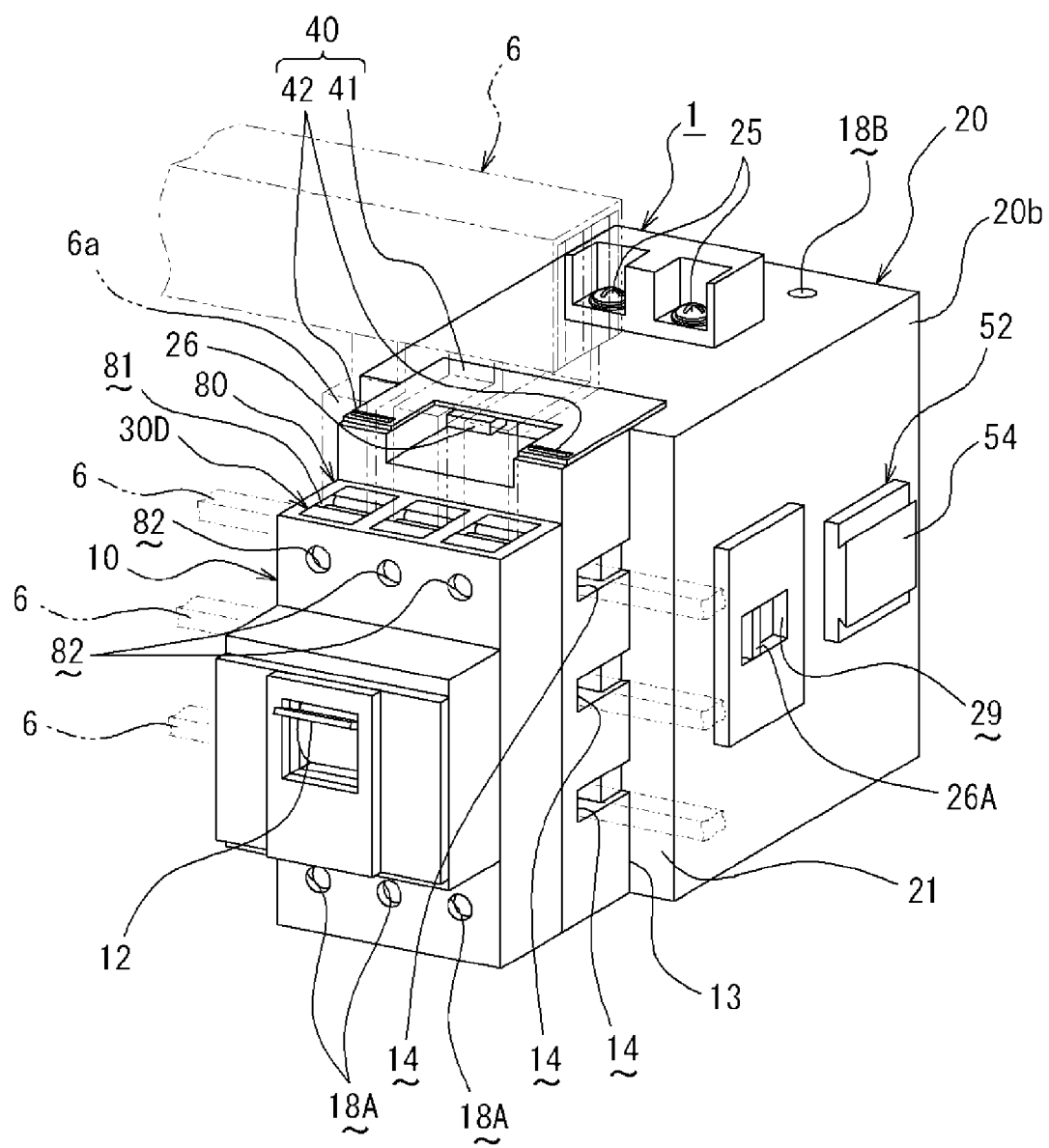
FIG. 21 is a schematic perspective view showing a plug-in unit in accordance with a fourth embodiment of the present disclosure.

Alternatively, by combining the configurations of the first embodiment and the third embodiment, the breaker 10 may be connected with busbars 6 at both the joint surface 13 and the top surface 80 of the breaker 10. That is, as illustrated in FIG. 21, like the first embodiment, a plurality (e.g., three) of recess grooves 14, in which terminal metal fittings 11 for the busbars 6 are installed, is provided in parallel to each other at the joint surface 13 of the breaker 10, and a holding member (not illustrated) is installed in a direction orthogonal to a lengthwise direction of the recess grooves 14 to hold the busbars 6 within the recess grooves at two ends by applying elastic force thereto. Further, like the third embodiment, a plurality (e.g., three) of plug-in terminal metal fittings 30D for the busbars is installed at the top surface 80 of the breaker 10, and the plug-in terminal metal fittings 30D may be connected with plug terminals 6a protruded from the busbars 6.

In a fourth embodiment as illustrated in FIG. 21, the same components as those of the first and third embodiments will be assigned same reference numerals and the explanation thereof will be omitted.

According to the fourth embodiment configured as stated above, the busbars 6 may be connected to one of the joint surface 13 and the top surface 80 of the breaker 10 or may be connected to both the joint surface 13 and the top surface 80, whichever is necessary. When the busbars 6 are connected to the joint surface 13 of the breaker 10, the busbars 6, which are connected with the terminal metal fittings installed in the plurality of recess grooves 14 provided at the joint surface 13 of the breaker 10, can be maintained in parallel to each other by the holding member 15, so that the busbars 6 can be prevented from being disjoined. Further, when the busbars 6 are connected to the top surface of the breaker 10, the busbars 6 can be connected with the breaker 10 after the breaker 10 is joined with the electric device 20.

The plug-in unit of the present disclosure is configured as explained above and the following effects can be achieved.

(1) In accordance with the present disclosure, a joint surface of a breaker is brought in direct contact with a joint surface of an electric device, so that a plug-in terminal metal fitting of the breaker is electrically connected with a plug terminal of the electric device, and the breaker and the electric device can be detachably joined to each other by an engaging member, whereby the number of components and the number of wiring processes can be reduced by removing a wiring connecting the breaker with the electric device and improvement in quality can be achieved by reducing errors in a wiring process.

(2) In addition to the effect (1), in accordance with the present disclosure, plug-in terminal metal fittings and plug terminals of a plurality of electric devices are electrically connected with one another and the electric devices can be detachably joined to each other by an engaging member, whereby the number of components and the number of wiring processes can be reduced by removing a wiring and improvement in quality can be achieved by reducing errors in a wiring process.

What is claimed is:

1. A plug-in unit comprising:
a breaker electrically connected with a busbar at a power supply side; and
an electric device electrically connected with the breaker,
wherein joint surfaces making contact with each other are formed at the breaker and the electric device, respectively,
the breaker includes a terminal metal fitting connecting the busbar thereto and a plug-in terminal metal fitting installed at the joint surface of the breaker,
the electric device includes a plug terminal, which is installed at the joint surface thereof and capable of being connected with the plug-in terminal metal fitting, and
the breaker is detachably joined with the electric device by an engaging member including an engaging unit and an engagement receiving unit, the engaging unit and the engagement receiving unit being installed at the joint surfaces of the breaker and the electric device, respectively, and being detachably engaged with each other.

2. The plug-in unit of claim 1, wherein the breaker has a recess that receives the plug-in terminal metal fitting, and
the electric device has a case that protrudes therefrom to surround the plug terminal and is detachably fitted and inserted into the recess.

3. The plug-in unit of claim 1, wherein the plug-in terminal metal fitting and the plug terminal are installed at one end side of the joint surfaces, and
the engaging member is installed at the other end side of the joint surfaces.

4. The plug-in unit of claim 1, wherein the engaging member includes:
the engaging unit which is elastically deformable and is installed at one of the joint surface of the breaker and the joint surface of the electric device; and
the engagement receiving unit which is detachably engaged with the engaging unit and is installed at the other joint surface.

5. The plug-in unit of claim 1, wherein the plug-in terminal metal fitting installed at the joint surface of the breaker includes a pair of clamp members press-contacted by spring force applied thereto,
an insertion hole for a release member that releases the spring force of the plug-in terminal metal fitting is provided at a side of the joint surface of the breaker, and
the plug terminal, which is inserted and engaged between the clamp members of the plug-in terminal metal fitting, is installed at the joint surface of the electric device.

6. The plug-in unit of claim 1, wherein a plurality of recess grooves, in which the terminal metal fittings for the busbars are installed, is provided in parallel to each other at the joint surface of the breaker, and
a holding member is installed in a direction orthogonal to a lengthwise direction of the recess grooves to hold the busbars within the recess grooves at two ends by applying elastic force thereto.

7. The plug-in unit of claim 1, wherein a plurality of plug-in terminal metal fittings for the busbars is installed at a top surface of the breaker, and
the plug-in terminal metal fittings are capable of being connected with plug terminals protruding from the busbars.

8. The plug-in unit of claim 1, wherein a plurality of recess grooves, in which the terminal metal fittings for the busbars are installed, is provided in parallel to each other at the joint surface of the breaker, a holding member is installed in a direction orthogonal to a lengthwise direction of the recess grooves to hold the busbars within the recess grooves at two ends by applying elastic force thereto, a plurality of plug-in terminal metal fittings for the busbars is installed at a top surface of the breaker, and the plug-in terminal metal fittings are capable of being connected with plug terminals protruding from the busbars.

9. The plug-in unit of claim 7, wherein the plug-in terminal metal fitting for the busbars includes a pair of clamp members press-contacted by spring force applied thereto, and an insertion hole for a release member that releases spring force of the plug-in terminal metal fitting is provided at a front surface facing the joint surface of the breaker.

10. The plug-in unit of claim 1, further comprising:

a plug-in terminal metal fitting at a rear surface facing the joint surface of the electric device.

11. The plug-in unit of claim 10, wherein the plug-in terminal metal fitting includes a pair of clamp members press-contacted by spring force applied thereto, and an insertion hole for a release member that releases the spring force of the plug-in terminal metal fitting is provided at a side of the rear surface of the electric device.

12. The plug-in unit of claim 1, wherein the electric device is made up of an electronic device, and a checking member for checking an electric conduction state during excitation caused by the electric conduction, is provided to appear or disappear with respect to the electric device.

13. The plug-in unit of claim 1, wherein a recess-shaped coupling unit or a protrusion-shaped coupling unit, detachably engageable with each other, is installed at a side surface of the electric device, and the recess-shaped coupling unit of an adjacent electric device is engaged with the protrusion-shaped coupling unit of the electric device, so that the electric device is detachably coupled with the adjacent electric device.

14. The plug-in unit of claim 1, further comprising:

a second electric device electrically connected with the electric device, wherein a plug-in terminal metal fitting is provided at a rear side joint surface opposing the joint surface of the electric device at a side of the breaker, the second electric device includes a plug terminal, which is provided at a front side joint surface of the second electric device in contact with the rear side joint surface of the electric device and capable of being connected with the plug-in terminal metal fitting, and the electric device is detachably joined with the second electric device by a second engaging member including an engaging unit and an engagement receiving unit, the engaging unit and the engagement receiving unit being installed at the joint surfaces of the electric device and the second electric device, respectively, and being detachably engaged with each other.

15. The plug-in unit of claim 14, wherein the electric device has a recess that receives the plug-in terminal metal fitting, and the second electric device has a case that protrudes therefrom to surround the plug terminal and is detachably fitted and inserted into the recess.

16. The plug-in unit of claim 14, wherein the plug-in terminal metal fitting and the plug terminal are installed at one end side of the rear side joint surface and the front side joint surface, and the second engaging member is installed at the other end side of the rear side joint surface and the front side joint surface.

17. The plug-in unit of claim 14, wherein the second engaging member includes:

the engaging unit which is elastically deformable and is installed at one of the rear side joint surface of the electric device and the front side joint surface of the second electric device; and the engagement receiving unit which is detachably engaged with the engaging unit and is installed at the other side joint surface.

18. The plug-in unit of claim 14, further comprising:

a plug-in terminal metal fitting at a rear surface facing the front side joint surface of the second electric device.

19. The plug-in unit of claim 14, wherein each of the plug-in terminal metal fittings of the electric device and the second electric device includes a pair of clamp members press-contacted by spring force applied thereto, and insertion holes for a release member that releases the spring force of the plug-in terminal metal fittings are provided at sides of the rear surfaces of the electric device and the second electric device.

20. The plug-in unit of claim 14, wherein each of the electric device and the second electric device is made up of an electronic device, and checking members for checking an electric conduction state during excitation caused by the electric conduction, are provided to appear and disappear with respect to the electric device and the second electric device.

21. The plug-in unit of claim 14, wherein recess-shaped coupling units or protrusion-shaped coupling units, detachably engaged with each other, are installed at side surfaces of the electric device and the second electric device, and the recess-shaped coupling units of an adjacent electric device and an adjacent second electric device are engaged with the protrusion-shaped coupling units of the electric device and the second electric device, so that the electric device and the second electric device are detachably coupled with the adjacent electric device and the adjacent second electric device, respectively.

* * * * *